United States Patent [19]

Malon

[11] Patent Number: 5,072,900

[45] Date of Patent: Dec. 17, 1991

[54] SYSTEM FOR THE CONTROL OF THE PROGRESSION OF SEVERAL RAILWAY TRAINS IN A NETWORK

[75] Inventor: Jean-Pierre Malon, Savignac-Les-Eglises, France

[73] Assignee: Aigle Azur Concept, Paris, France

[21] Appl. No.: 496,202

[22] Filed: Mar. 19, 1990

[30] Foreign Application Priority Data

Mar. 17, 1989 [FR] France .................... 89 03555

[51] Int. Cl.⁵ .................... B61L 3/16; B61L 25/02
[52] U.S. Cl. .................... 246/5; 246/182 B; 246/187 B
[58] Field of Search .............. 246/3, 5, 122 R, 167 R, 246/167 D, 182 R, 182 A, 182 B, 182 C, 187 R, 187 A, 187 B

[56] References Cited

U.S. PATENT DOCUMENTS

| | | | |
|---|---|---|---|
| 3,601,602 | 8/1971 | Smith | 246/122 R X |
| 3,676,669 | 7/1972 | Jauquet | 246/187 B X |
| 3,808,427 | 4/1974 | Malon et al. | 246/182 C X |
| 3,888,437 | 6/1975 | Birkin | 246/122 R X |
| 4,027,840 | 6/1977 | Blair | 246/122 R |
| 4,038,653 | 7/1977 | Brewster | 246/122 R X |
| 4,093,161 | 6/1978 | Aver, Jr. | 246/187 A X |
| 4,181,943 | 1/1980 | Mercer, Sr. et al. | 246/182 B X |
| 4,711,418 | 12/1987 | Aver, Jr. et al. | 246/187 B X |
| 4,735,383 | 4/1988 | Corrie | 246/122 R X |
| 4,768,740 | 9/1988 | Corrie | 246/122 R X |
| 4,863,123 | 9/1989 | Bernard et al. | 246/122 R |
| 5,006,989 | 4/1991 | Parker | 246/182 R |

FOREIGN PATENT DOCUMENTS

| | | |
|---|---|---|
| 2657719 | 6/1978 | Fed. Rep. of Germany ... 246/187 A |
| 3337183 | 4/1985 | Fed. Rep. of Germany . |
| 2189066 | 10/1987 | United Kingdom . |

Primary Examiner—Frank E. Werner
Assistant Examiner—Scott L. Lowe
Attorney, Agent, or Firm—Wenderoth, Lind & Ponack

[57] ABSTRACT

Each train is equipped with an on-board device for detecting the position of the train with respect to the track and with a transmitter-receive communicating with a central station. The central station has an instantaneous storage of the relative positions of all of the trains in the network, storage of the itineraries of each train, the characteristics of the network related to the speed range, and of the performance of the rolling stock in service. The central station constitutes the organizing unit of the system and comprises a transmission at regular time intervals of messages containing the identification numbers of the trains in circulation which are authorized to follow their route, taking account of position information received from these trains by the central station and of speed range parameters contained in the storage. The device on board each train constitutes an execution unit of the system and recognizes the identification number of the train with which it is associated and controls the stopping of the train in the absence of the identification number in the message which it receives from the central station.

36 Claims, 15 Drawing Sheets

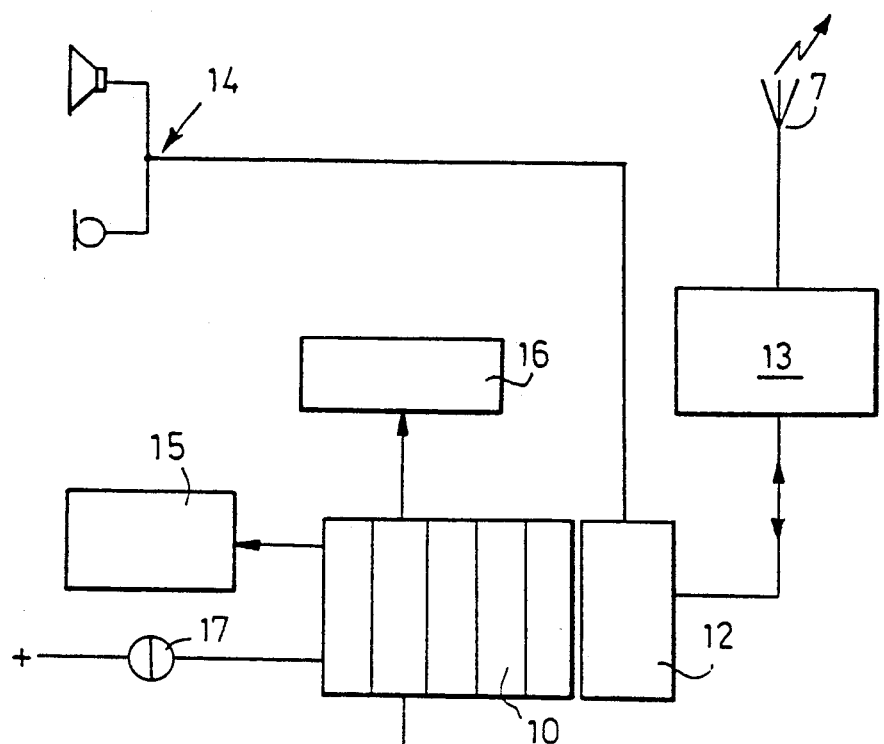
FIG.2
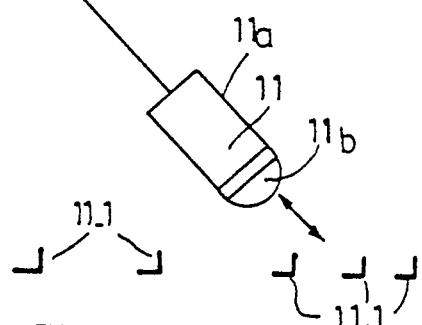
FIG.3
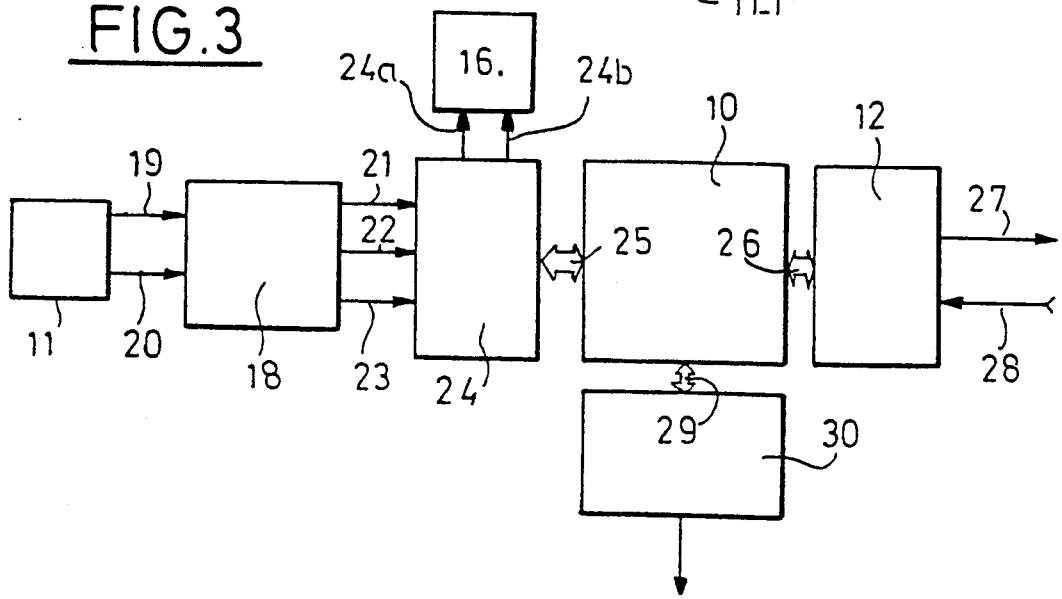

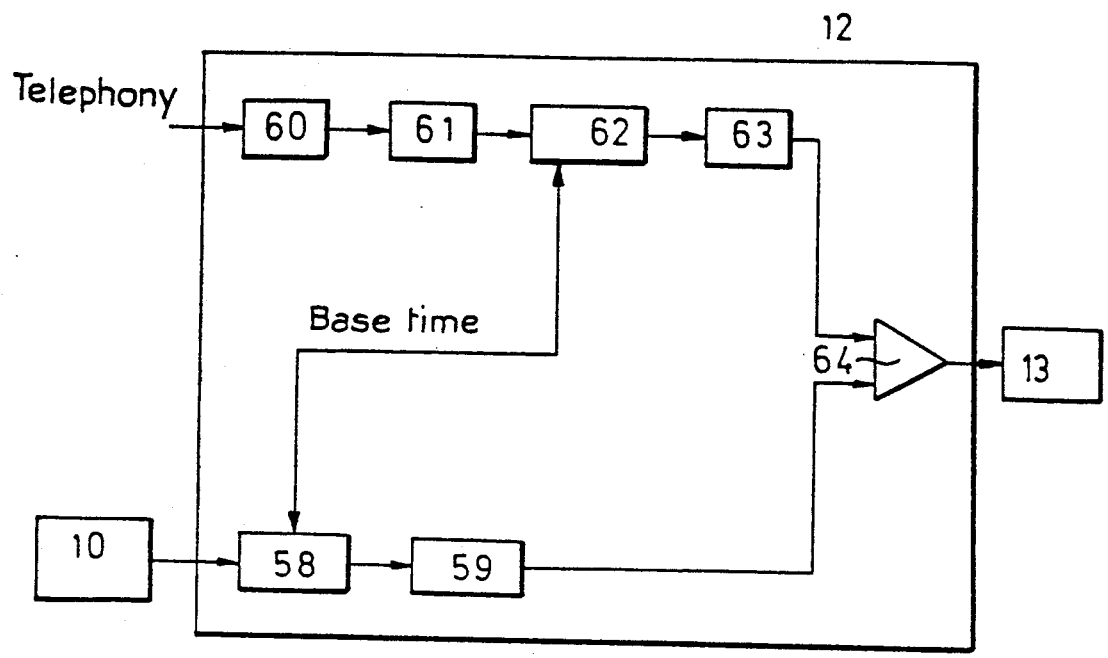
FIG.5
FIG.6
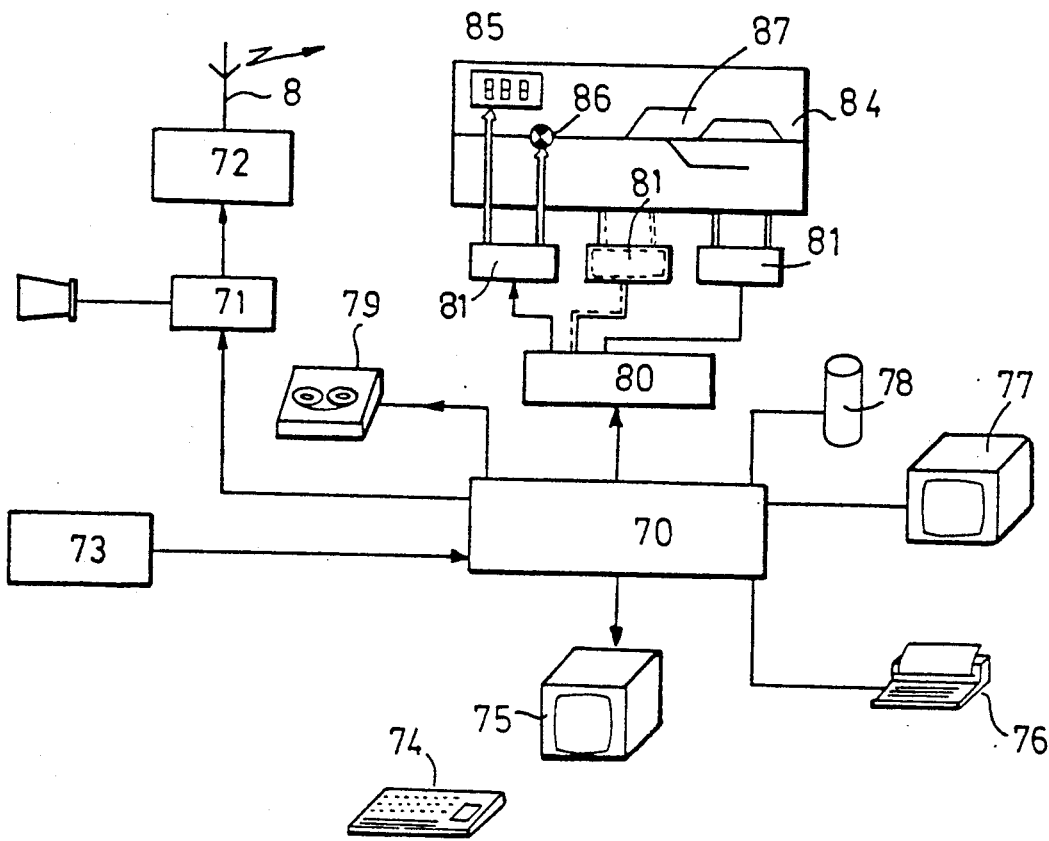

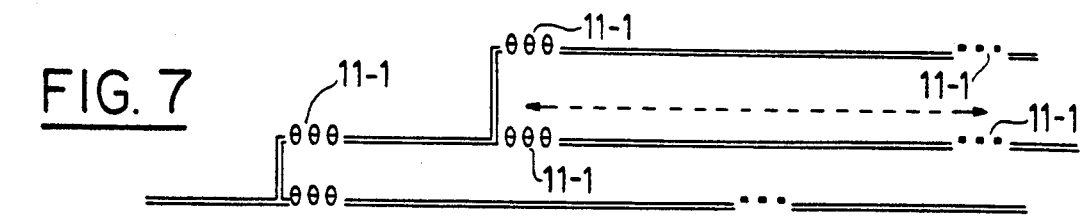
FIG. 7
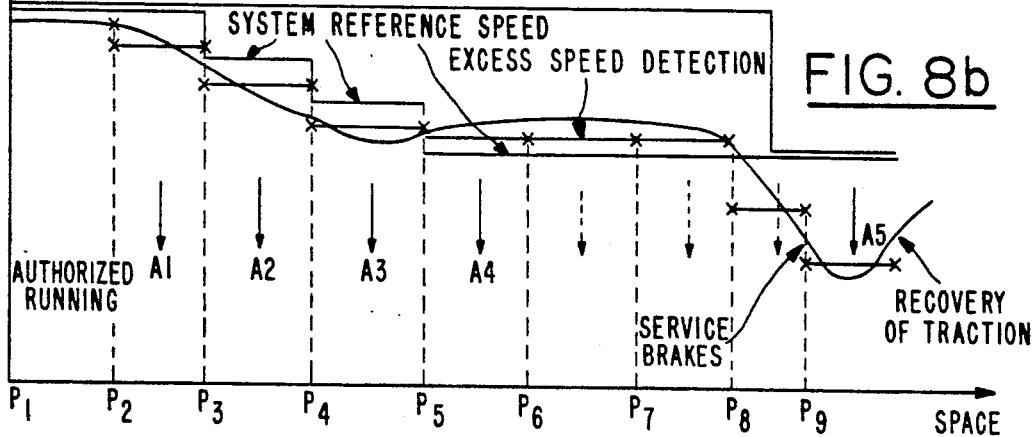
FIG. 8a
FIG. 8b
FIG. 9

SYSTEM FOR THE CONTROL OF THE PROGRESSION OF SEVERAL RAILWAY TRAINS IN A NETWORK

BACKGROUND OF THE INVENTION (1) Field of the Invention

The present invention relates to control systems for the circulation of trains in a railway network, and relates more particularly to a system for the management of a railway network from a central station.

(2) State of the Prior Art

Railway network management systems are known which comprise means of location and of transmission fitted to each train, with a certain number of computers distributed on the ground over the entire network and connected to each other, capable at any time of asking the trains for their position and their speed and of determining the setting of the points placed on the itinerary of the interrogated trains. The data received by the computers constitute a data base supplying a complete and quasi-instantaneous representation of the network and of the trains which are running in the network.

These known systems are, furthermore, provided with data processing means which, on the basis of the collected data, provide regulation of the traffic by intervening in the form of orders given to the drivers of the trains, authorization of instructions or driving advice.

These known systems have the disadvantage of requiring speed data from each train and of using, for the determination of the speed of a train, speed sensors counting the revolutions of wheels. These speed sensors lack accuracy since they give rise to cumulative errors.

Compensating for these errors necessitates the use of electronic beacons disposed approximately every kilometer on the ballast, which increases the cost of the installation.

SUMMARY OF THE INVENTION

The invention aims to provide a system for the management of a railway network which, while being of relatively simple construction particularly with regard to the track equipment, has improved safety with respect to existing systems.

Its object is therefore a system for the control of the progression of several railway trains in a railway network, each train being equipped with an on-board device for detecting the position of the train with respect to the track and with transmit-receive means communicating with a central station, the central station comprising a means of instantaneous storage of the relative positions of all of the trains in the railway network, a means of storage of the itineraries of each train, the characteristics the network related to the speed range, and of the performance of the rolling stock in service. The central station constitutes an organizing unit of the system and comprises a means of transmission at regular time intervals of messages containing the identification numbers of the trains in circulation, which are authorized to follow their route, taking account of position information received from these trains by the central station and of speed range parameters contained in the means of storage. The device on board each train constitutes an execution unit of the system and comprises a means of recognition of the identification number of the train with which it is associated and a means of controlling the stopping of the train in the absence of the identification number in the message which it receives from the central station.

The system according to the invention enables each of the trains to be followed by a quasi-continuous control of excess speed and a control of the deceleration before any stopping point.

When a train reaches a speed limit or does not adopt a sufficient deceleration in order to guarantee a stopping point, the system according to the invention applies service braking until its speed is brought within the authorized limits.

The system according to the invention in fact performs an integral monitoring of the circulation of the trains in the network which it manages, and its structure enables it to carry out a moving and deformable space protection.

BRIEF DESCRIPTION OF THE DRAWINGS

The invention will be better understood with the help of the following description, given solely by way of example, with reference to the appended drawings, in which:

FIG. 2 is a block diagram of an on-board device in a train in the system of FIG. 1;

FIG. 3 is a more detailed block diagram of the structure of the on-board device;

FIG. 5 is a block diagram of a transmission interface for the signals supplied by the on-board device to a transmitter-receiver;

FIG. 6 is a block diagram of a central station of the system according to the invention;

FIG. 7 is a diagram representing an arrangement of groups of passive beacons on a track of a railway network equipped with the system according to the invention;

FIGS. 8a and 8b are diagrams illustrating the monitoring, protection and control of the slowing down of a train using the system according to the invention;

FIG. 9 is a diagram showing a distribution of beacons in the network;

DETAILED DESCRIPTION OF THE PREFERRED EMBODIMENT

Figure 1:
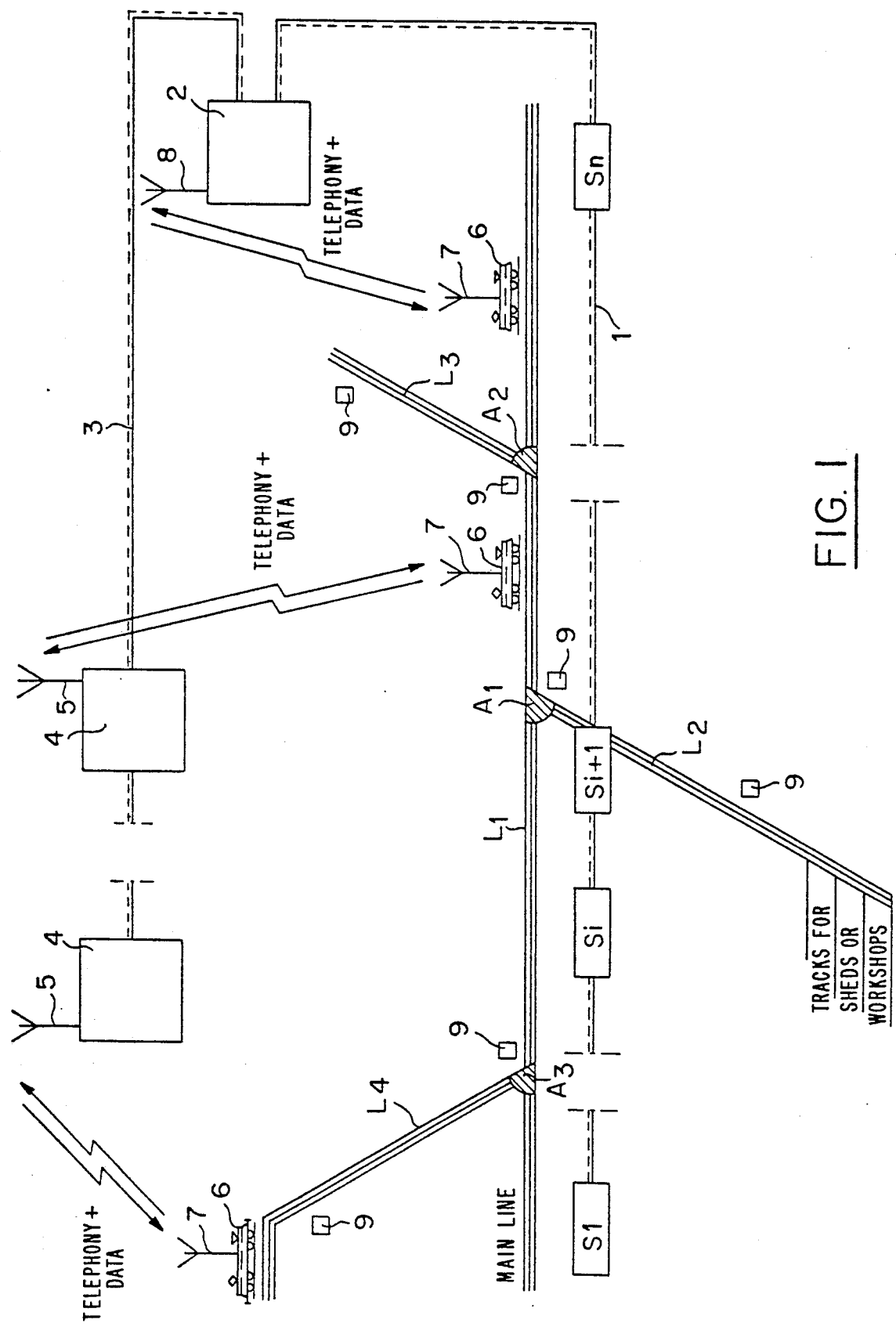
FIG. 1 is a general diagram of a system for the management of a railway network according to the invention.

The general architecture of the system according to the invention will be described with reference to FIG. 1.

The network managed by the system is represented by a main line L1 to which are connected branches L2 and L3 by corresponding points A1 and A2.

To the main line L1 there is also connected, by a point A3, a secondary line L4 which is not managed by the system.

Along the main line L1 there are disposed stations S1, ... Si, Si+1 ..., Sn equipped with logic control of signalling such as, for example, lights.

The stations S1 to Sn are connected to each other by a dedicated telephonic link 1, which also connects the abovementioned stations to a central station 2 for the real time management of the line L1. Alternatively each station can communicate with the central station over a microwave link.

The central station 2 is in turn connected by a telephonic link 3, or by a microwave link, to microwave relays 4 provided with VHF antennas 5, by means of which they are in communication with equipment on board motor carriages 6, which are provided with VHF antennas 7.

The central station 2 is also provided with a transmitter-receive having a VHF antenna 8 for communicating over a microwave link with the equipment on board trains circulating within its mesh, similar to the microwave relays 4.

Along the lines there are disposed at predetermined locations beacons 9 for the entering of trains into the network managed by the system according to the invention.

The function of the central station 2 is to receive, monitor and process the status data of the network which it manages in order to authorize or prohibit the running of trains, their entry into the network and their exit from the network.

The equipment on board the motor carriages 6 and the beacons 9 which locate the position of each train are informers for the central station 2 of the state of occupation of the network.

The central station 2 comprises two computers (in order to overcome availability problems) which are continuously informed of the actual position of all of the trains in circulation, and consequently, of their relative positions in the network.

These computers also know the geographical position from the status of the switch gear of the network and, because of this, the itineraries traced.

The on-board device fitted to each train is represented diagrammatically in FIG. 2.

It principally comprises an on-board computer 10 connected by one of its inputs to a Doppler radar 11 for determining the displacement of the train with respect to the track on which it is travelling.

The Doppler radar works in conjunction, on the one hand, with the ground and, on the other hand, with the passive beacons 11-1, constituted by groups of dihedrons and disposed along the track at intervals described and known by the central station 2, whose number and interval are related to the level of accuracy of the radar and to the desired accuracy of train position determination.

Detected by a train and transmitted in encoded form to the central station 2, the disposition of these beacons on the track characterizes the exact geographical position of this same train.

These beacons are passive and constituted by metal elements welded on the cushion of the rail in the preferred but not limitative embodiment of the invention.

They are grouped at precise geographical points and the measurement of the relative space separating each of these elements enables the transmission to the train of an encoded message to be transmitted to the central station for the purpose of indicating its precise location.

The computer 10 is furthermore connected by means of a transmission interface circuit 12 to a transmitter-receiver 13 provided with its VHF antenna 7 and to telephonic equipment 14 intended for the driver.

The computer 10 is furthermore connected to a display system intended for the driver 15, to a service or emergency braking control circuit 16 and to a limited speed key 17.

The running of the train is made possible only when the service braking control circuit is inactive.

The final purpose of the on-board device is to provide service braking each time that safety restrictions demand this.

The service braking must be inhibited each time that at least one of the following three functions is verified:

a) running authorization supplied by the central station 2, or the AM1 function, b) running authorization given on the ground while the train is running through tunnels or in shaded zones, called the AM2 function, and c) the limited speed key 17 is actuated.

The task of the on-board computer 10 consists in processing all of the signals which it receives from the radar 11, from the ground and from the beacons of the equipment on the ground, which will subsequently be relevant, and from the transmitter-receiver 13, and to generate from these signals the running authorization instructions AM1 and AM2.

The limited speed key 17 for use by the driver enables a reduced speed running in the case of failure of the system according to the invention.

The block diagram given in FIG. 3 shows in greater detail the structure of the on-board device.

In this diagram the Doppler radar 11 is connected to an interface circuit 18 for the processing of radar signals by mean of two channels 19 and 20.

The interface circuit 18 is connected by three outputs 21, 22 and 23 to corresponding inputs of a parallel interface circuit 24 in communication with a central processing unit which constitutes the computer 10 of FIG. 2, by means of a bus 25.

The emergency braking control interface circuit 16 is connected to the interface circuit 24 by the links 24a and 24b (AM1 and AM2).

The central processing unit 10 is connected by a bus 26 to the microwave link communication interface 12, which includes one output 27 to the VHF transmitter and one input 28 for receiving signals from the VHF receiver of the transmitter-receiver 13 (FIG. 2), coming from the central station 2 (FIG. 1).

The central processing unit 10 is furthermore connected by a bus 29 to a serial transmission interface circuit 30 connected to the display unit 15 (FIG. 2) for use by the driver.

The radar signals processing interface circuit 18 will be described in detail with reference to FIG. 4.

The input 19 coming from the Doppler radar 11, constituting channel 1 of the device, is connected to a low pass filter 35 whose cut-off frequency Fc is 5 KHz.

The output of the filter 35 is connected to the input of a variable gain amplifier 36 whose output is connected to an analog-digital conversion circuit 37. A data bus 38 is connected to analog digital conversion circuit 37 and goes to the amplifier 36 and to a microprocessor 39 containing a signal processing program.

The input 20 coming from the radar 11, which constitutes channel 2 of the device, is similarly connected to the microprocessor 39 by means of a low pass filter 40, a variable gain amplifier 41, an analog-digital conversion circuit 42 and a bus 43 which joins the bus 38 in order to form a common data bus 44.

A programmable clock circuit 45 is connected to the bus 43.

It is furthermore connected to a logic interrupt circuit 46 whose output is connected to an interrupt input of the microprocessor 39.

The two analog-digital converters 37 and 42 furthermore comprise inputs connected to the output of a divider circuit 47 of the basic clock signal supplied by the microprocessor 39.

Between the low pass filter 40 and the amplifier 41 there is connected an amplifier 48 whose output is connected to the input of a threshold circuit 49.

The output of the threshold circuit 49 is connected to a signal rectifier 50 whose output supplies a signal SDI, which is a radar signal reflected by the dihedrons disposed on the track, and then processed in order to supply a rectangular pulse for each dihedron encountered.

A watch dog and zero reset circuit 51 is associated with the microprocessor 39.

One output of the microprocessor 39 is connected by means of a galvanic isolation circuit 52 to an interface circuit 53 whose outputs supply the digitized Doppler signal.

Another output of the microprocessor 39 is connected by means of a galvanic isolation circuit 54 to an interface circuit 55 whose outputs supply a signal of the direction of displacement of the train with respect to the track.

The interface circuits 53 and 55 are connected to the corresponding inputs of the adaptor circuit 24 shown in the diagram of FIG. 3.

Figure 5A:
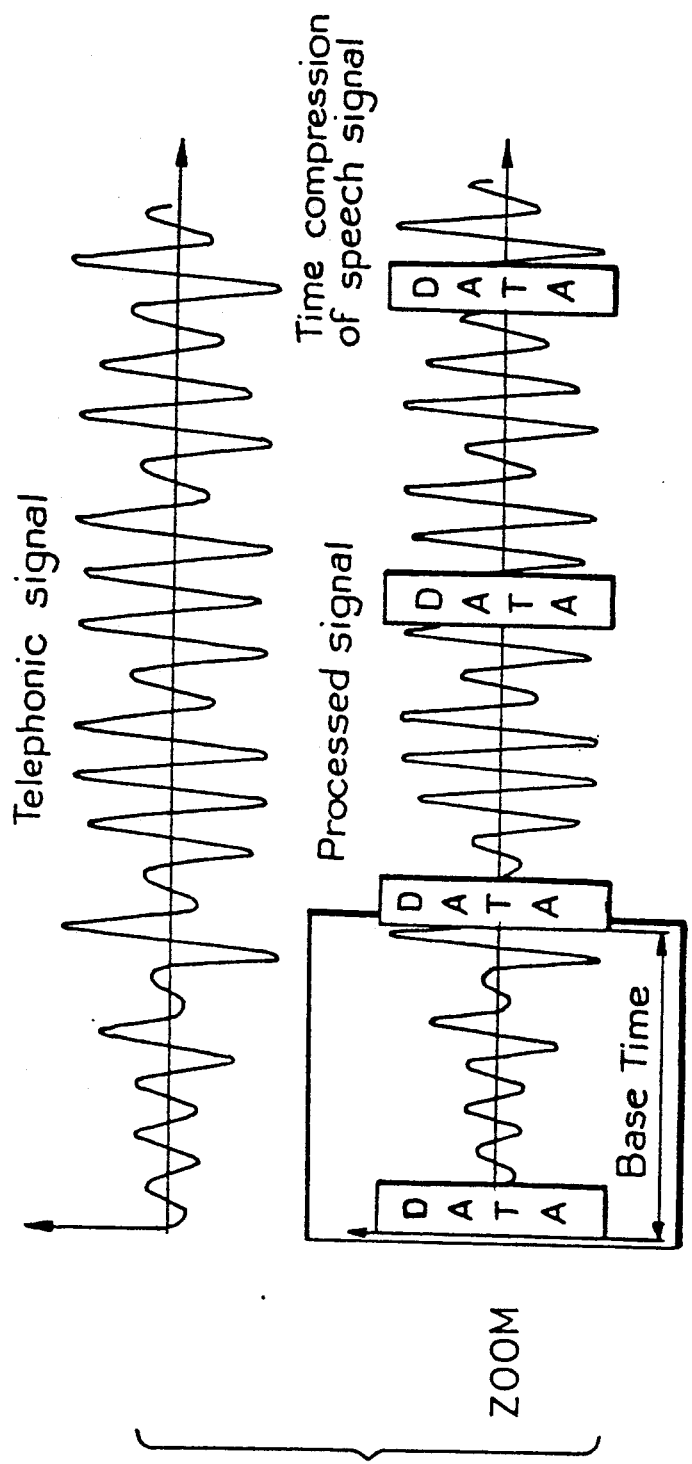
FIG. 5a is a diagram showing a mode of entering data relating to the system into a telephonic signal flow.

The transmission interface circuit 12 connected to the transmitter-receiver 13 of the device described with reference to FIGS. 2 and 3 is shown in greater detail in FIG. 5.

The circuit 12 comprises a logic circuit 58 for the transmission of data, whose input is connected to the output of the central processing unit 10 (FIG. 3) and whose output is connected to a modem 59 operating at, for example, 1200 baud.

A second input of an circuit 12 is connected to the input telephonic channel coming from the equipment 14 of FIG. 2 and comprises a low pass filter 60 connected to an analog-digital converter 61. The output of the converter 61 is connected to a temporary memory 62 which, by means of a digital-analog converter 63, is connected to an input of an adder 64, of which another input is connected to the output of the modem 59.

The adder 64 is connected by its output to the transmitter-receiver 13 (FIG. 2).

The interface circuit 12 enables the insertion of the transmission of modulated digital data into the telephonic channel, without disturbing the characteristics.

The diagram given (FIG. 5a) shows how, during each refresh cycle of information from the network (time base) the actual data of the system according to the invention are inserted into the telephonic signal flow.

The data generated by the on-board computer 10 (FIG. 5) are serialized by the circuit 58 in order to supply a base band signal, which is then modulated by the circuit 59.

The telephonic signal flow, after filtering by the circuit 60 and digital conversion by the circuit 61, is temporarily stored in the random access memory 62.

The synchronization of the circuits 58 and 62 is ensured by a clock supplied by the computer 10 which is synchronous with the time base.

This synchronization enables, by means of the circuits 59 and 63, an adding of the "compressed telephony" signals and the "modulated data" by the circuit 64. The output of the latter therefore supplies a signal which can be directly used by the low frequency inputs of the transmitter-receivers 13 (FIG. 5).

A circuit similar to circuit 12 (not shown) enables reception of the signal supplied by the transmitter-receivers 13 (FIG. 5) and separation of the two parameters (the data and the speech) in order that the respective parameters may be used.

The system on board each train permanently monitors the displacement of the train by means of the detection of the radar 11 (FIG. 2) which is fixed, for example, under the body of the motor carriage 6 (FIG. 1).

The Doppler radar 11 is constituted by a microwave source operating, for example, at 9.9 GHz.

It works in conjunction with the ground in order to supply a permanent signal representing the movement of the train, and locally with the passive beacons by means of whose echo it enables the system according to the invention to locate the train accurately.

The track is composed of a multitude of potential radar "reflectors", such as the stones of the ballast, the sleeper screws, the sleepers, the rails, etc.

The beam of the radar 11 not being punctual, several targets are simultaneously illuminated and return elementary signals whose amplitudes and phases are variable. The combination of these elementary signals constitutes a continuous Doppler signal when the train is moving.

It is then processed in order to extract the sought displacement information.

A fraction of the signal is transmitted to the transmitting antenna of the radar. Another fraction of this signal is transmitted to a mixer (not shown) and constitutes a reference which, mixed with the signal reflected by the ground, generates a Doppler beat whose period is proportional to the displacement of the radar.

It is the same antenna which transmits and receives the signals reflected by the ground.

All of the electronics of the radar are built into a cylindrical body 11a which receives at one of its ends a lens 11b which is directed towards the ground at a predetermined angle of 35° for example. This lens focuses the transmitted and received signals onto the microwave antenna.

The processing of the output signal of the Doppler radar 11 consists in a counting of the Doppler periods when the signal has an amplitude which can be used.

Figure 4:
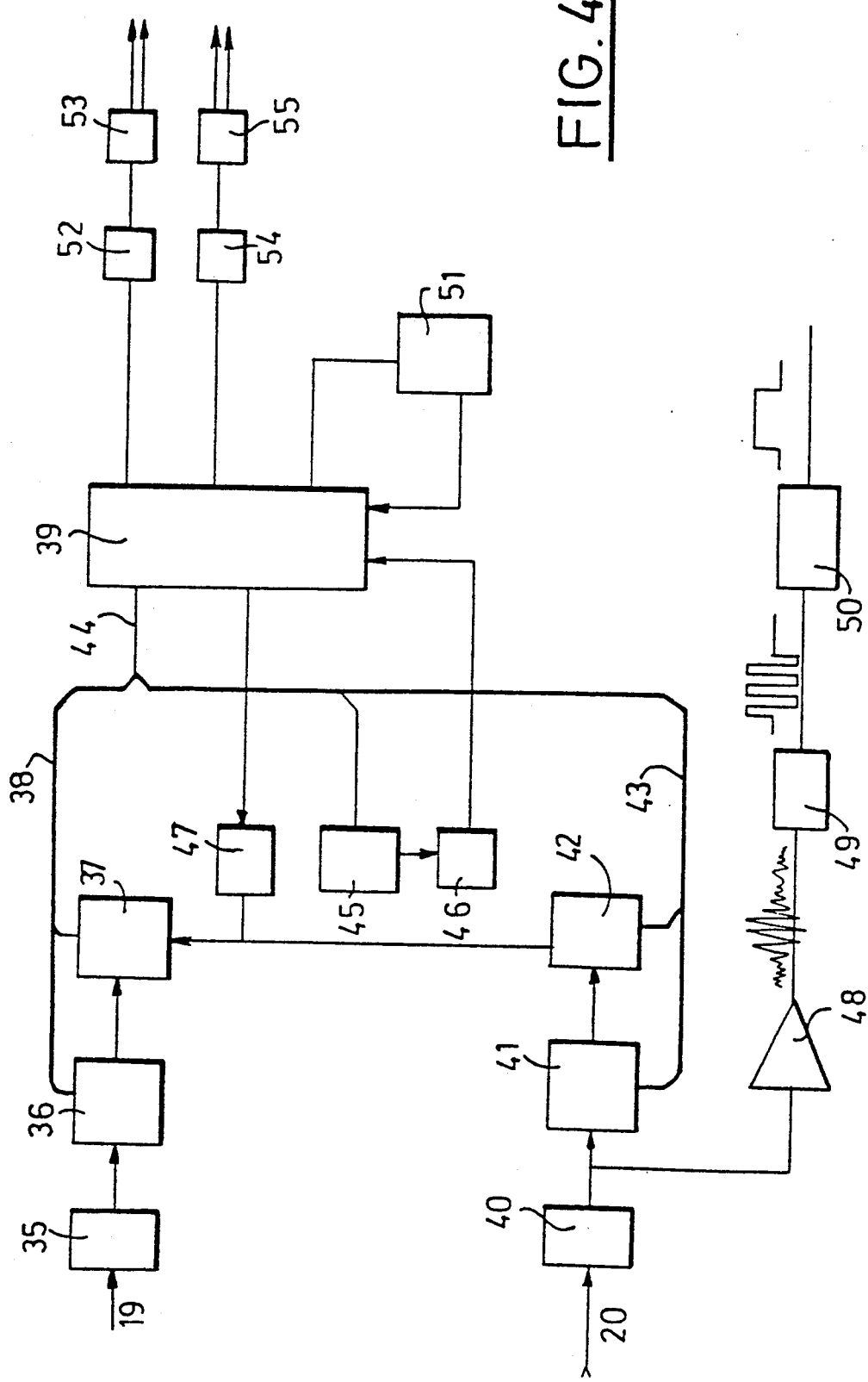
FIG. 4 is a more detailed diagram of a radar signals processing interface.

When the signal is too weak, the periods are reconstituted by using the previous periods as a reference, by means of software supported by the microprocessor 39 shown in FIG. 4.

The radar 11 advantageously comprises two systems which are identical but which have a phase difference of 90°. It is possible to detect the direction of movement of the train by measuring the relative phase difference of these two channels by counting up in one direction and counting down in the other; the calculated position, under these conditions, is correct whatever the direction of movement may be.

The dihedrons constituting the beacons are themselves detected by the radar 11 whose signal, extracted from one of the channels, is processed by the elements 48, 49 and 50 (FIG. 4). The output of the signal rectifier 50 is intended to supply a rectangular pulse representative of each dihedron.

The profile of these elementary mechanical elements forms a 90° dihedron such that a polarized microwave beam striking it at an angle of 45° with respect to its edge and at a geometric angle of incidence which is merged with the bisector of the dihedron, is reflected with a rotation of polarization of 90°.

The radar receiving antenna 11 is also placed at an angle of 90° with respect to its transmitting antenna in such a way that it gives priority to the rays reflected by the dihedrons to the exclusion of other reflections generated by the ballast.

The signal/noise ratio of the transmission thus performed is greatly improved with respect to conventional detection and guarantees a very low error rate.

The computer 10 of the on-board device is intended to manage the signals coming from the radar and the signals going to or coming from the transmit-receive system 13 (FIG. 2).

It receives the information coming from the "limited speed" key 17 for use by the driver and provides the latter with information relating to the driving (actual speed, "target speed").

The core of the computer 10 is a 16-bit microprocessor, for example of the 68000 type, associated with input-output peripherals.

The central station 2 of the system according to the invention is shown in greater detail in FIG. 6.

It comprises a central computer 70 connected by means of a "telephonic-data" interface circuit 71 to a transmitter-receiver 72 connected to the antenna 8 (FIG. 1).

The circuit 71 is identical in all respects to the diagram of interface circuit 12 in FIG. 5 and performs the same functions for the central station.

The central computer is furthermore connected to an interface and modem circuit 73 enabling, by means of a wire or telephonic link, the computer to be informed of the position of the switch gear.

It is furthermore connected to a console comprising a keyboard 74 and a screen display device 75, to a printer 76, to a high resolution display device 77, to a hard disk memory 78 and to a backup recording device 79.

It is associated with a control interface computer 80 whose outputs are connected to power control circuits 81.

The power-control circuits 81 provide the control of a display panel 84 comprising digital displays 85 and light indicators 86 marking out a graphical reproduction 87 of the network.

The functioning of the system will now be described with reference to various flowcharts shown in the drawings.

However, before describing the actual functioning, a certain number of functions which the system must perform will be mentioned below. Location functions:

For computing the speed of the trains, the central station 2 has a time base, which is the cycle time between two successive responses from the same train (three seconds for example).

It is therefore capable of determining by computation the average speed of each train on a line.

The central station computes an average speed between two instants of scanning the trains which form a time interval In.

As the trains can be subjected to a positive or negative acceleration during this interval, this results in a certain inaccuracy of measurement which it is necessary to take into account in complying with the protection curves Speed=F (Space).

An estimate, increased by the inaccuracy in the computation of speeds, is produced as follows:

Let:

T be the cycle time for scanning the position of each train by the central station 2;

Vo be the instantaneous speed of the train at an instant 0;

Vr be the real instantaneous speed of the train subjected to an acceleration during the computing interval, T;

Vc be the average speed during the time T, computed by the central station 2;

Xo be the position of the train at the instant 0 (that which is received by the central station);

Xt be the position of the train at the instant T (that which is received by the central station);

$\delta$ be the error in computing the speed by the central station at the instant T.

$$\delta = |(Vr - vc)| \quad (1)$$

The central station computes the speed using the formula:

$$Vc = (Xt - Xo)/T \quad (2)$$

The following can be written:

$$Xt = 1/2 \sqrt{T^2} + Vo\, T = Xo \quad (3)$$

By combining the expressions (2) and (3), the following is obtained:

$$V = 1/2 \sqrt{T} + Vo \quad (4)$$

Now, the real speed of the train subjected to the acceleration is:

$$Vr = \sqrt{T} + Vo \quad (5)$$

The expressions (1), (4) and (5) supply the sought value of the maximum error in determining the speed of the train by the central station 2.

$$\delta = 1/2 \sqrt{T}$$

By way of example, a numerical application of the determination of the calculated speed error will be given.

Knowing that the acceleration of a train is never greater than 1 m/s$^2$ and assuming that T=3s, the calculated speed is underestimated by 1.5 m/s or 5.4 km/h.

In order to avoid increasing the margin of uncertainty over the measured space due to cumulative errors, the system according to the invention makes use of fixed elements disposed on the track.

These are the dihedron-shaped beacons 11-1 disposed on the track and already described with reference to FIG. 2.

These dihedrons are disposed in groups, each group forming a code which the train decodes as it passes.

The train adds this code to its next progression message which provides the central station with one of the following three items of information;

repositioning by comparison of the received code and the code described in the geographical files of the line, enabling a correction of the errors due to the inaccuracy of the odometer;

removal of doubt at each point on the actual itinerary of the train; and spatial inhibition of the service braking in order to allow, under certain conditions, the passing through of tunnels and of shaded zones known to the microwave transmission.

The accuracy of the odometer radars such as the radar 11 (FIG. 2) being on the order of 1/1000 and the desired resolution relating to the position transmitted by the trains being 10 m, the distance Dmax which must separate two successive groups of repositioning dihedrons is such that Dmax (1/1000)=10 m.

Which gives: Dmax=10 km

In FIG. 7, an example of a distribution of groups of dihedrons 11-1 over a portion of a railway line is shown.

Two groups of dihedrons are disposed at the level of each point and ensure the removal of uncertainty in the itinerary taken by a train, while groups of repositioning dihedrons are disposed along each line at regular intervals of, for example, 10 km.

In order to monitor the correct functioning of the odometer and to be ensured of the validity of the received messages, the central station of the system continuously carries out a consistency check by a recurrent analysis carried out at predetermined time intervals, for example every three seconds.

Let $X_n$, $V_n$ and $X_{n+1}$, $V_{n+1}$ be the positions and speeds of the train at the times $t_n$ and $t_{n+1}$ respectively.

The exact position of the train is certainly known at the repositioning points represented by the dihedrons 11-1.

Knowing the position $X_n$ and speed $V_n$ of the train and the time interval $In=t_{n+1}-t_n$, and taking account of the dynamic performance of the train at the considered speed, the central station derives from this a range in which the value $X_{n+1}$ must be found.

If the received value is not included in the abovementioned range, the measuring system is considered as faulty and the central station takes the safety measures which are imposed on it.

The central station has in its memory the description of the network and, particularly, the positions of the dihedrons. It provides for each train the range in which the repositioning must occur.

If outside of this range, an event has not taken place, the central station detects an inconsistency and imposes the appropriate restrictions.

Protection functions:

The protection of the running of a train is provided as follows:

The central station continuously checks that the train is not running at excess speed. For this purpose it has a distance/speed table enabling it, for each level of speed, to know the minimum distance authorized before the service braking. Under these conditions, the system provides a mobile and deformable protection enabling it to guarantee safety with respect to:

the position of the trains immediately before and after it (anti-collision)

the slowing down and stoppage points whose characteristics are held in its memory. The latter can be modified at any time by simple programming.

As soon as it considers a situation to be critical, the action of the central station consists in not including, in its message, the number of the train or of the trains running at excess speed, and this causes the application of the service braking.

The on-board electronics only allows the train to run if it is identified by recognition of its number in the cyclic message transmitted by the central station.

In order to reduce the untimely braking procedures which could be caused by temporarily unfavourable radioelectric transmission conditions, the system chooses to wait for the reception of two successive messages from the central station not containing the number of the train in question before engaging a service braking.

Any non-identification outside of a "watch dog" slightly greater than the refresh time gives rise, when it is repeated twice in succession, to a service braking.

P being the probability that a transmitted message does not arrive at its recipient—P is a function of the quality of the transmission on the network and can only be known statistically—the probability of untimely braking of the train is, due to this, increased to $P^2$ (if this probability were even greater, it would be necessary to choose, such that where would be the acceptable probability threshold for service braking not required).

From this latter arrangement, a delay in the establishment of the braking F results, which is taken into account by the central station in the computation of the protection curves of each train.

This delay time is equal to 2(T) and is added to the delay time due to the response of the mechanical elements.

The monitoring and protection of the train are provided in the way described with reference to FIGS. 8a, 8b and 9.

The central station knows, within a tolerance band which is a function of the refresh cycle, the status of the network with regard to its variables: the actual position of each of the trains in the network.

The computer also holds the description of the network with regard to fixed information (geographical infrastructures, essential characteristics of the trains) and with respect to modifiable information (point setting or the composition of the trains).

Under these conditions, the computer has all of the elements necessary for protecting the network.

Each train is identified by its number, and the computer checks, in real time, that its speed does not exceed the authorized speed instruction over the section which it is occupying.

The control method is shown in FIG. 8b in which the speed instruction is represented by a continuous horizontal line, while the real speed of the train is represented by segments having a duration equal to the duration T of a control cycle giving the average value of the real speed during each of the cycles. This average speed is that which the central station 2 determines by computation.

The real speed is represented by a continuous curve intersecting each of the average speed segments.

For a given train, at each reception of a message from the train, the computer of the central station computes the speed of the train and checks that its value is less than the instruction speed Vc:

$$D_p/T + \delta < V_c$$

where δ is, as previously explained, an increase of the inherent error in the principle of determination of speed by the central station 2.

In this case, the computer authorizes the transmission of the number of the train which is authorized to continue running.

The control of slowing down is illustrated in FIG. 8b.

In this figure, the instruction speed is represented by successive echelons of decreasing value situated inside a curve having one echelon representing the theoretical speed range.

The decreasing of the echelons preferably follows a parabolic law, which has proved to be the most natural braking law. At constant deceleration, the Space=F(-speed) curve is a parabola.

At the approach to a slowing down, the instruction speed reduces progressively. It is nevertheless necessary to anticipate the slowing down in order to take account of the duration of interrogation of all of the trains. The effect of this is slightly to reduce the performance of the line by obliging the driver to slow down before the normal application of braking.

A device giving visual and audible advance warning of the "target" speed facilitates driving by avoiding untimely tripping of the service braking.

The braking parabola, computed for a given speed as a function of the characteristics of the train, is lengthened by the distance X travelled during two cycle times.

This spatial value X is equivalent to the distance which can be travelled by a train which, starting at the upper instruction speed, would be in the maximum acceleration phase for 2T.

In the case of excess speed, the central station stops the transmission of the number of the train in question and the latter is braked by the service braking until its speed again becomes lower than the instruction speed.

The computer of the central station again authorizes the forward movement of the train and the control of the latter is returned to the driver by the resending of its number.

The speed instructions apply to all of the configurations of the network, including itinerary traces, imperative stops, etc...

The characteristics of each train being known by the central station, all of these speeds, protection spaces and stop distances are adapted as a consequence for each train.

The computer also takes into account all of the pure delay times between the transmission and the actual application of the braking effort for each type of equipment.

Entry of a moving vehicle into the system:

The entry of a train onto a track managed by the system according to the invention is illustrated by the diagram in FIG. 9 in which a main track L1 and a secondary track L4 have been shown.

On the main track, at the level of the point, there is provided a group of dihedrons 11-1.

On the secondary track a group 11-1 of entry dihedrons associated with a presence of train detector 91 is placed upstream of the point.

At the level of the point another group of dihedrons 11-1 is associated with a presence detector 93.

The presence detectors can advantageously be constituted by a cable laid along the rails on each side of the track in order to form a loop. In the absence of a train, the circuit is tuned and enables the functioning of a safety oscillator.

When a train passes, the metallic mass of the assembly detunes the oscillating circuit and authorizes detection.

The central station knows the state of the main track L1, and particularly the occupation of the approach zones framing the point of intersection.

Consequently, it continuously determines whether or not a moving vehicle coming from the secondary line L4 can continue its itinerary and enter, without risk, onto the main track, and then gives this information to the driver by transmitting the "target" speed information to the display device.

The "target" speed "0" is displayed in red in the driving cab if the entry conditions are not satisfied.

A "target" speed level is, on the other hand, displayed in the driving cab when all of the conditions for the entry of the train in complete safety are satisfied.

The state of occupation of each detector 91 and 93 (FIG. 9) is cyclically transmitted to the central station by the same means as that used by the trains or by a dedicated wire link.

Associated with the dihedrons, the function of these detectors is to inform the central station of the intentions of a moving vehicle to enter onto the main line or to leave it.

As soon as the central station is informed by means of the detector 91 (FIG. 9) of the presence of a train, it must receive, during the following interrogation cycles, the identification number of the detected train and the number of the beacon seen by the train.

The reception of the number of the train is added, by the central station 2, to its identification table of moving vehicles in service on the main track and the number of the beacon which enables it to locate, within its geographical tables, the exact position of the train.

If the "central station/detector" and "central station/train" dialogue is not established under the required conditions as previously described, the train is considered as defective and will not be authorized by the central station to enter the network.

The driver is informed of this situation by means of his display unit, all arrangements having been made over the telephonic channel in order to ensure the repair of the train in question before its entry onto the main track.

If the dialogue is established under the required conditions, the train receives from the central station the "target" speed "0" in the case of waiting for entry, or the "target" speed corresponding to the accepted entry speed if the state of occupation of the main track permits it.

The driver is informed of these "target" speed levels by his display unit.

The detector 93 and the beacon 11-1 associated with it enable the establishment of a dialogue with the central station 2, informing the latter of the actual introduction of the train onto the main track.

When a train leaves the network supervised by the system according to the invention, it is no longer managed by it from the moment that the central station has detected its passage at the level of the detector 91 placed at A on the secondary line L4 of FIG. 9.

From that moment, the central station excludes it from its tables in the protection computations and it can continue its journey freely, the spatial inhibition of service braking is provided by the beacon 11-1 placed at A.

The functioning of the system will now be described with reference to the flowcharts of FIGS. 10 to 16.

Figure 10:
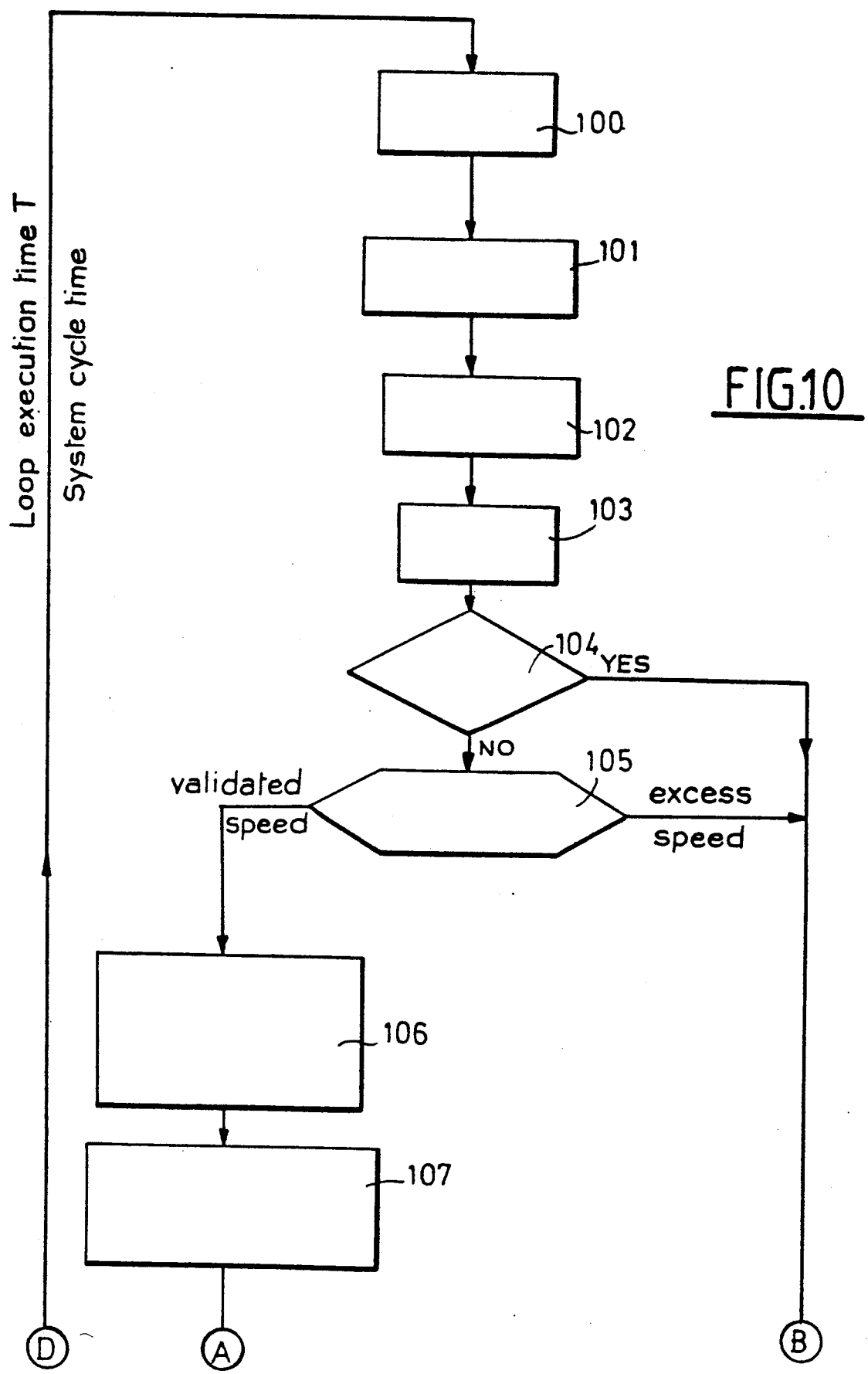
FIGS. 10 to 12 show a general operating flowchart of the system according to the invention.

At the central station 2:

Firstly referring to FIG. 10 during the phase 100 the central station 2 is requested to proceed with the processing of information for each of the trains 1 to n which are in the network managed by the system.

During the phase 101, there is a reading of the position of the train No i: Posi(t) with $1 \leq i \leq n$.

Posi(t) being the position of the train i at the instant t.

During the phase 102, there is computation of the speed of the train i using the expression:

$$\frac{|Posi(t) - Posi(t - T)|}{T}$$

in which T is the cycle time for scanning the position of each train by the central station 2.

During the phase 103, the central station carries out consistency checks, i.e. checking that for each of the trains in question the position received at the instant t is located within a predetermined range computed from the position at the instant $t - T$ and taking account of the dynamic performance of the train.

During the phase 104, there is verification of a detection of an inconsistency in a position message received from a train in question.

If there is a negative response, the central station starts a phase 105 of comparing the speed of the train with the constants of the network, which are the limits and the theoretical speed which are in the memory of the central station.

If an inconsistency has been detected, the train is no longer authorized to run, and the system goes to a phase which will be described with reference to FIG. 11.

If during the phase 105 it is noted that the speed of the train is correct with respect to the constant limits of the network, the central station proceeds during a phase 106 with the reading of the status table of the parameters of the network, such as the switch gear settings and the programmed stops at the stations.

Then, during a phase 107, the central station 2 searches in the status table of the variable elements of the network for the position of the two trains on either side of the train in question with integration of the length of the train which precedes train No.i.

If, during the phase 105, the central station 2 noted that the train in question was travelling at excess speed, the train is no longer authorized to run, and the central station 2 moves to the phase mentioned above which will be described with reference to FIG. 11.

Figure 11:
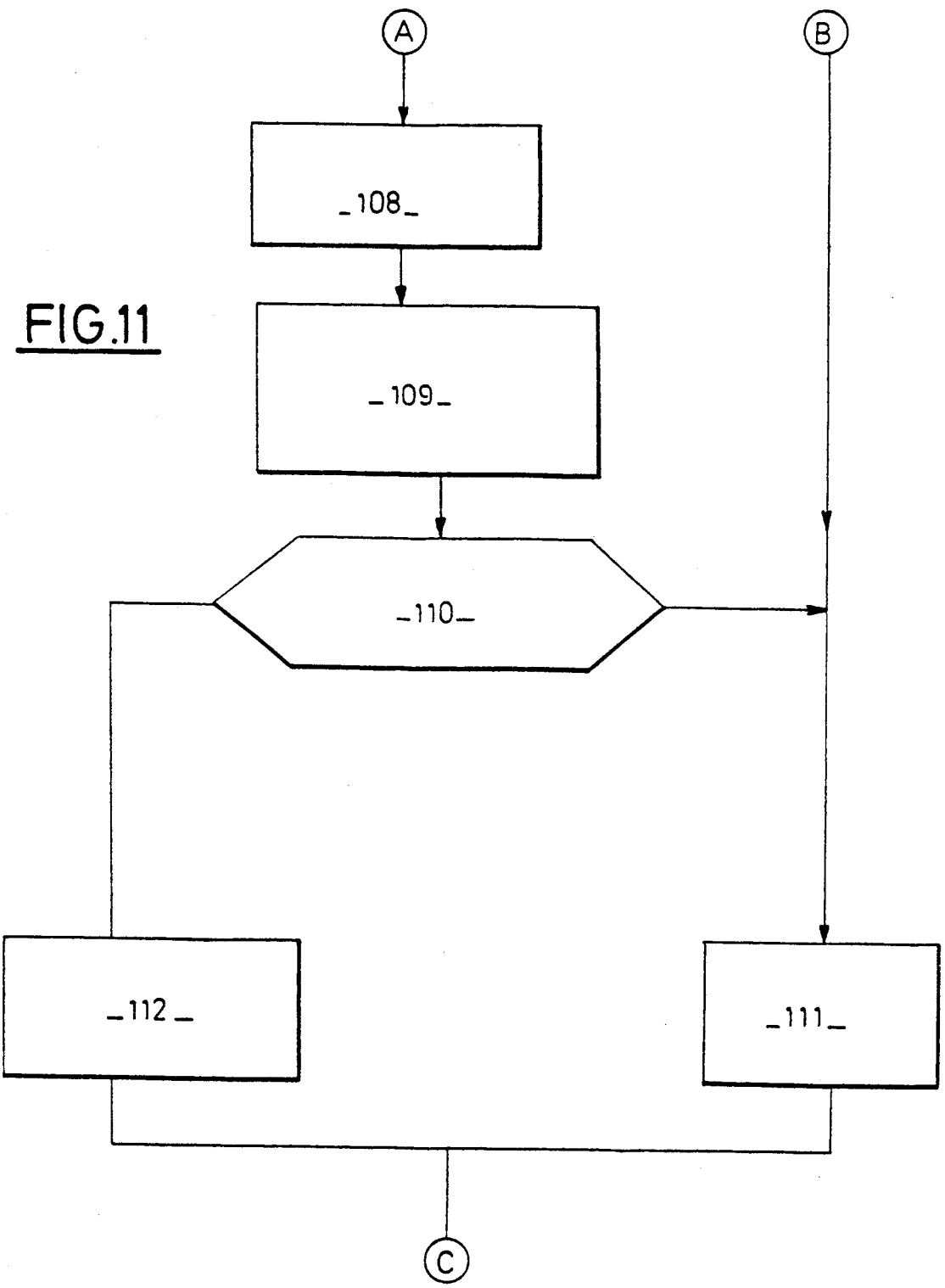

At the end of the phase 107, the central station 2 moves on to a phase 108 in the section of the flow chart shown in FIG. 11, during which the central station 2 searches among the elements which can have parameters and those which are variable for the most restrictive one for the progression of the train No i.

During a phase 109, the central station 2 computes the minimum distance Dmin:

of stopping the train if the most restrictive element is a stop point, of slowing down if the most restrictive element is a new slower speed instruction.

During a phase 110, the central station 2 checks if the minimum distance Dmin, increased by a safety buffer space, particularly taking into account the space measurement error of the odometer, is greater than or equal to the distance separating the train from the most restrictive element.

In other words, it is checked if, in relation to the most immediate restrictions on the train, taking account of its performance and the nature of the track at that instant, the train has reached a critical Space-Speed point implying a service braking procedure Fs.

If the answer is yes, the train is no longer authorized to proceed, and the central station 2 goes on to a phase 111 of eliminating the number of the train, which must brake using service braking from the table TAUT of the train authorized to proceed.

This phase is also activated in the case of positive responses obtained at the end of phases 104 and 105 of the section of the flowchart shown in FIG. 10.

If during the phase 110 it is established that the minimum distance Dmin is less than the distance separating the train from the most restrictive element, the central station 2 goes on to the phase 112, of authorization of the train to proceed by placing its identification number in the table TAUT of trains authorized to proceed.

Figure 12:
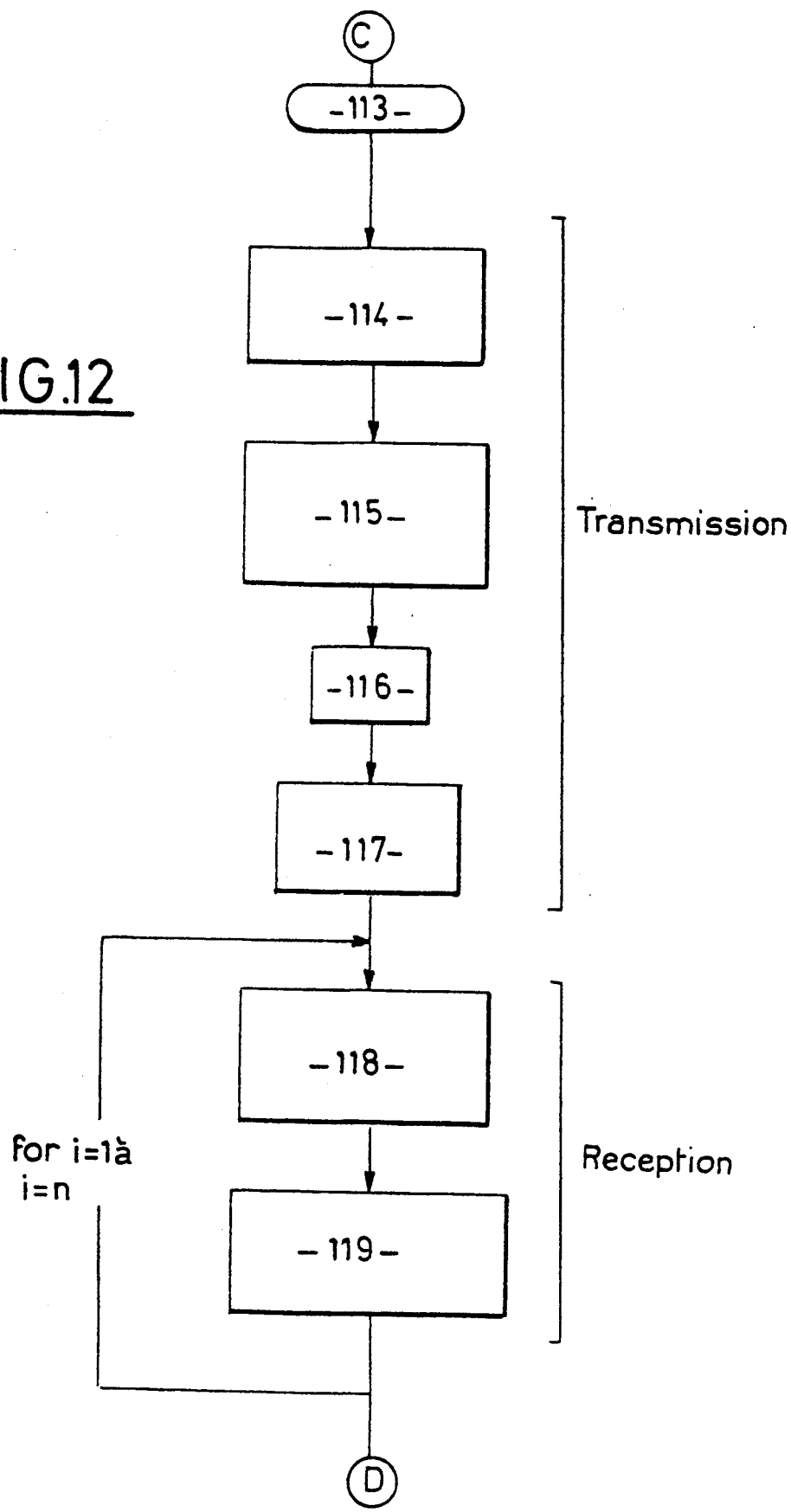

During a phase 113 of the section of the flowchart shown in FIG. 12, the central station 2 prepares itself to proceed with the VHF transmission-reception of the message to the trains which are running.

For this purpose, during a phase 114, there is a reading of the table TAUT of the trains authorized to proceed from the memory of the computer 70 of the central station 2.

Then, during a phase 115, there is a composition by the central station 2 of the message to the network. This message contains:

the identification numbers of all the trains authorized to proceed; six bits suffice to identify the trains.

the instruction speed for each train, intended for the driver; four bits suffice to supply an indication of "target speed" in steps of 10 km/h, from 0 to 160 km/h.

the identification of the transmission channel reserved for each train as a function of its position in the network and of the time slot which is reserved for it in this channel; six bits suffice to generate this information.

Consequently, a 16-bit message is intended for each train.

The error checking is applicable over the complete message, all trains included.

Phase 116 is a timing phase enabling the overall time of the operating cycle to be adjusted.

The message from the central station is transmitted during phase 117.

During a phase 118, which is one of the reception phases, there is a reading of the serial link coupler, in order to extract the messages transmitted by each train.

During a phase 119 there is a placing of the position of each train in the table of the positions of the trains.

Phases 118 and 119 are repeated for the trains:

i=1 to i=n

Then, the cycle of operations described above is restarted. The execution time of the loop or cycle time of the system is equal to T.

Figure 13:
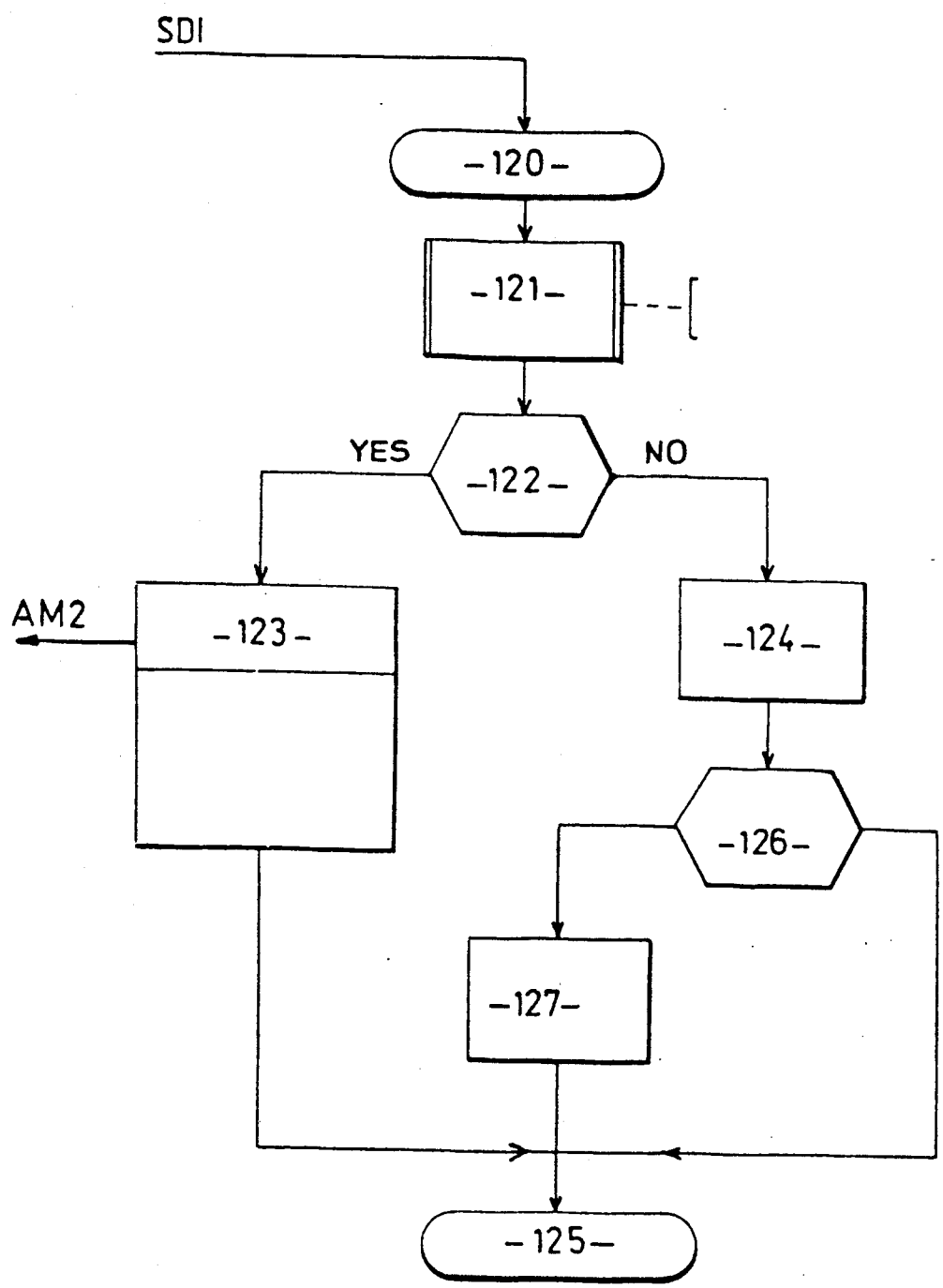
FIG. 13 shows a flowchart for the processing of signals generated by the beacons on the ground.

In the on-board equipment:

FIG. 13 shows the flowchart of processing signals coming from the dihedrons 11-1 on the ground.

The application to the central processing unit 10 of signals SDI coming from the signal rectifier 50 of the circuit in FIG. 4 causes an interrupt phase 120.

This phase is followed by a phase 121 of acquisition and recognition of the message formed by the dihedrons on the ground constituting a beacon and which will be explained with reference to FIG. 14.

During a phase 122, it is determined if the message is intended for the space system.

If in the affirmative (beacon at the input of a tunnel or a shaded zone), the system moves to a phase 123 of activation of the space system and the transmission of a signal AM2 to the service braking 16 (FIG. 3), authorizing the running of the train and the resetting to zero of a space software counter C2 associated with the space system.

If in the negative, a message is coming from the geographic repositioning beacons 11-1.

During a phase 124, there is a zero resetting of a software counter C1 of travelled space, since this space is measured with respect to these beacons.

At the end of the phase 123 the system moves directly to an end of interruption 125.

At the end of the phase 124, the nature of the beacon which generated the message is determined during a phase 126.

If it is a repositioning beacon, we move directly to the end of interrupt phase 125.

If it is a beacon at the points location, we move on to a phase 127 of storing the number of this beacon in the memory MEM 1 of the central processing unit 10 for the purpose of transmitting it subsequently to the central station 2. Then comes the end of the interrupt phase 125.

Figure 14:
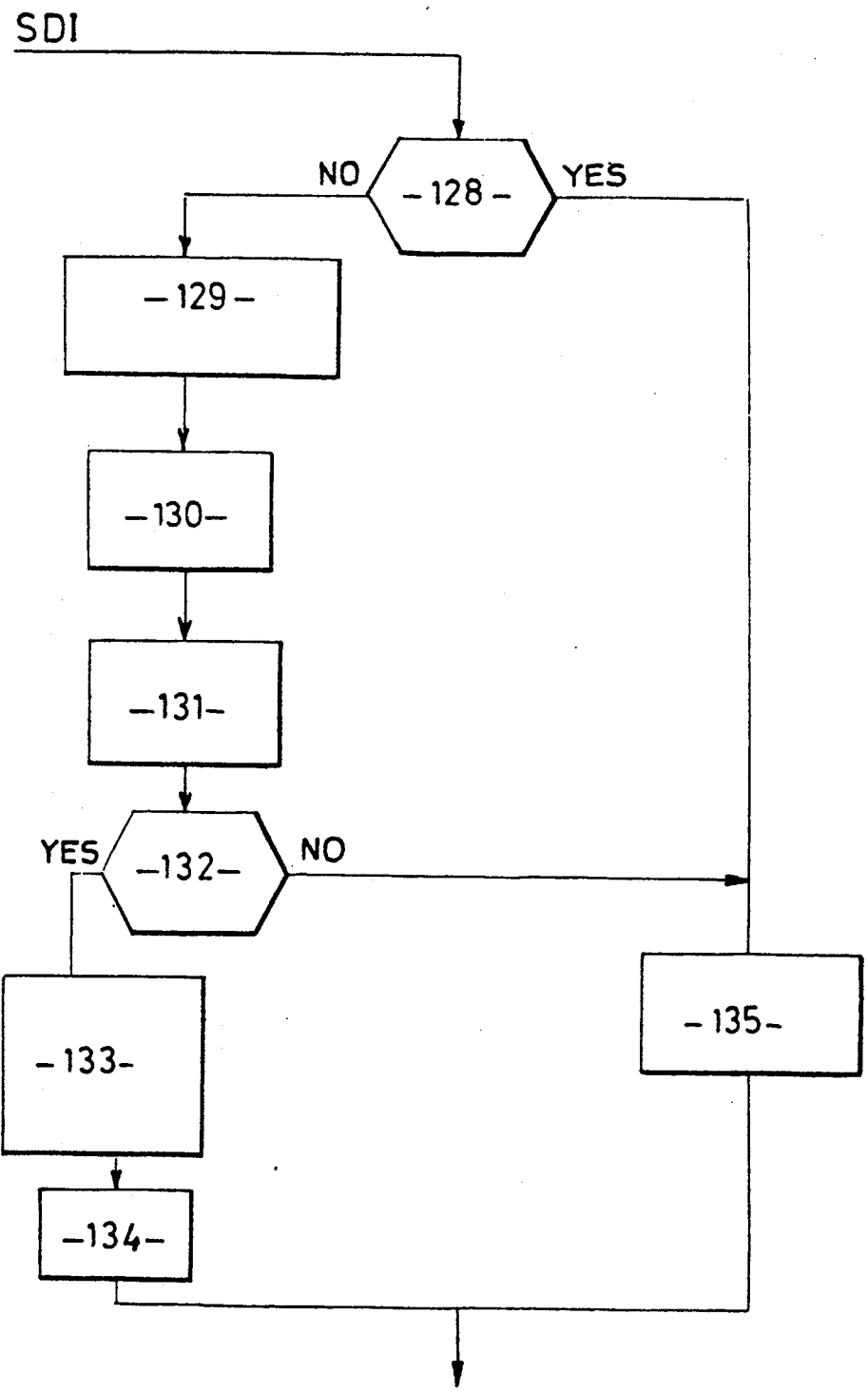
FIG. 14 shows a flowchart for the acquisition and recognition of messages formed by the beacons on the ground.

FIG. 14 shows a flowchart of the acquisition and recognition of messages formed by the dihedrons on the ground for the purpose of identifying a beacon.

On receiving a message SDI formed by each dihedron on the ground, coming from the processing circuit of FIG. 4, there is a determination during a phase 128 of whether or not the variable representing the interdihedron space EID is zero.

If this variable is not zero, it is allocated, during a phase 129, with a value which is the difference between the space travelled at that instant and its previous value, which is the space travelled at the time of interruption due to the preceding dihedron (see phase 135).

This difference constitutes the inter-dihedron space EID with which a binary state is associated during a phase 130.

During a phase 131 a binary word is constructed by the juxtaposition at each interrupt of previous binary states.

During a phase 132 it is checked whether the binary word is complete.

If the binary word is complete, a phase 133 analyses if this word belongs to the table of beacons in memory, and during a phase 134 the variable EID is reset to zero in order to prepare for a subsequent reception of a new beacon.

If during the phase 128 it proves that the variable EID is equal to zero, this singnifies that the train has encountered the first dihedron of the beacon and the variable EID is directly initialized at the value of the space travelled during the phase 135.

Such is also the case if during the phase 132 it has been established that the binary word is not complete.

Figure 15:
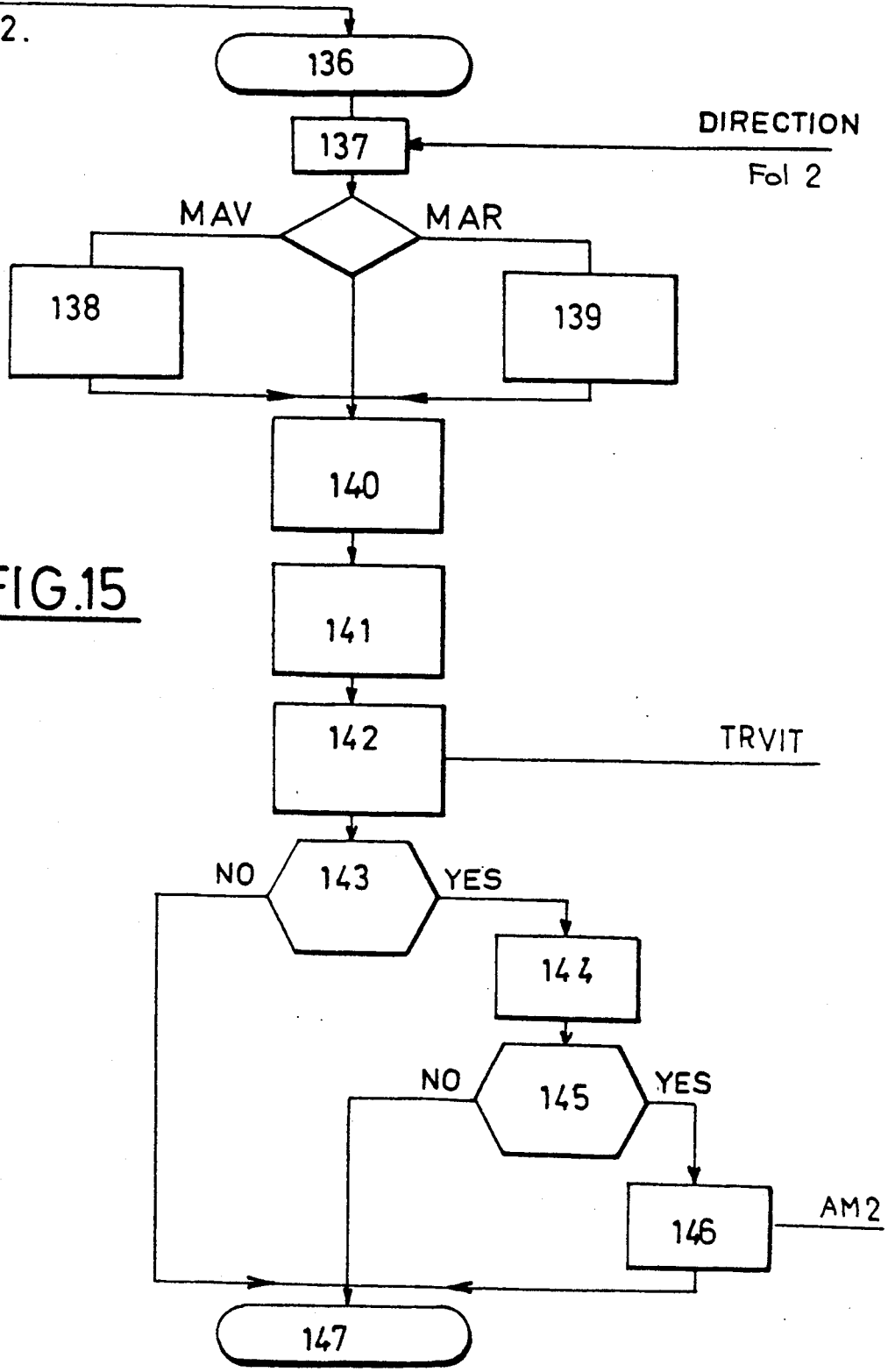
FIG. 15 is a flowchart for the processing of the Doppler signal.

The processing of the Doppler signal is illustrated by the flowchart shown in FIG. 15.

The digitized Doppler signal appearing at the output of the interface circuit 53 of the circuit in FIG. 4 causes an interrupt phase 136.

Then, during a phase 137, the direction of travel of the train is read out using the direction signalgenerated by the interface signal 55 of the circuit in FIG. 4.

In the case of a forward movement, there is during a phase 138, an incrementation of the software counter C1 of the space travelled with respect to the last beacon encountered and initialized during the phase 123 (FIG. 13).

In the case of backward movement, there is, during a phase 139, a decrementation of the software counter C1.

These two phases are followed by a phase 140 of storing the state of the software counter C1 in a memory (MEM2) of the central processing unit 10.

Then, during the phase 141, there is formation of the message MESVHF: MEM1+MEM2+ERROR DETECTING CODE which will subsequently be transmitted to the central station.

During a next phase 142, there is computation of the real speed of the train and transmission of the signal TRVIT to the interface 30 (FIG. 3) for the display of this information on the unit 15 (FIG. 2) for use by the driver.

During a phase 143, there is a determination of whether or not the space system is active.

If a answer is yes, there is, during the phase 144, an incrementation of the space counter C2.

Then during a phase 145, there is verification of whether the content of the software counter C2 is equal to the length of the system (this length being constant and predefined).

If the answer is yes, there is, during a phase 146, a forcing of the signal AM2 to 0, the space system no longer transmitting authorization to proceed (space "quota" exhausted).

If the answer is no, we move on to a end of the interrupt phase 147, to which phase we also pass directly if the space system proves to be inactive during the phase 143.

Figure 16:
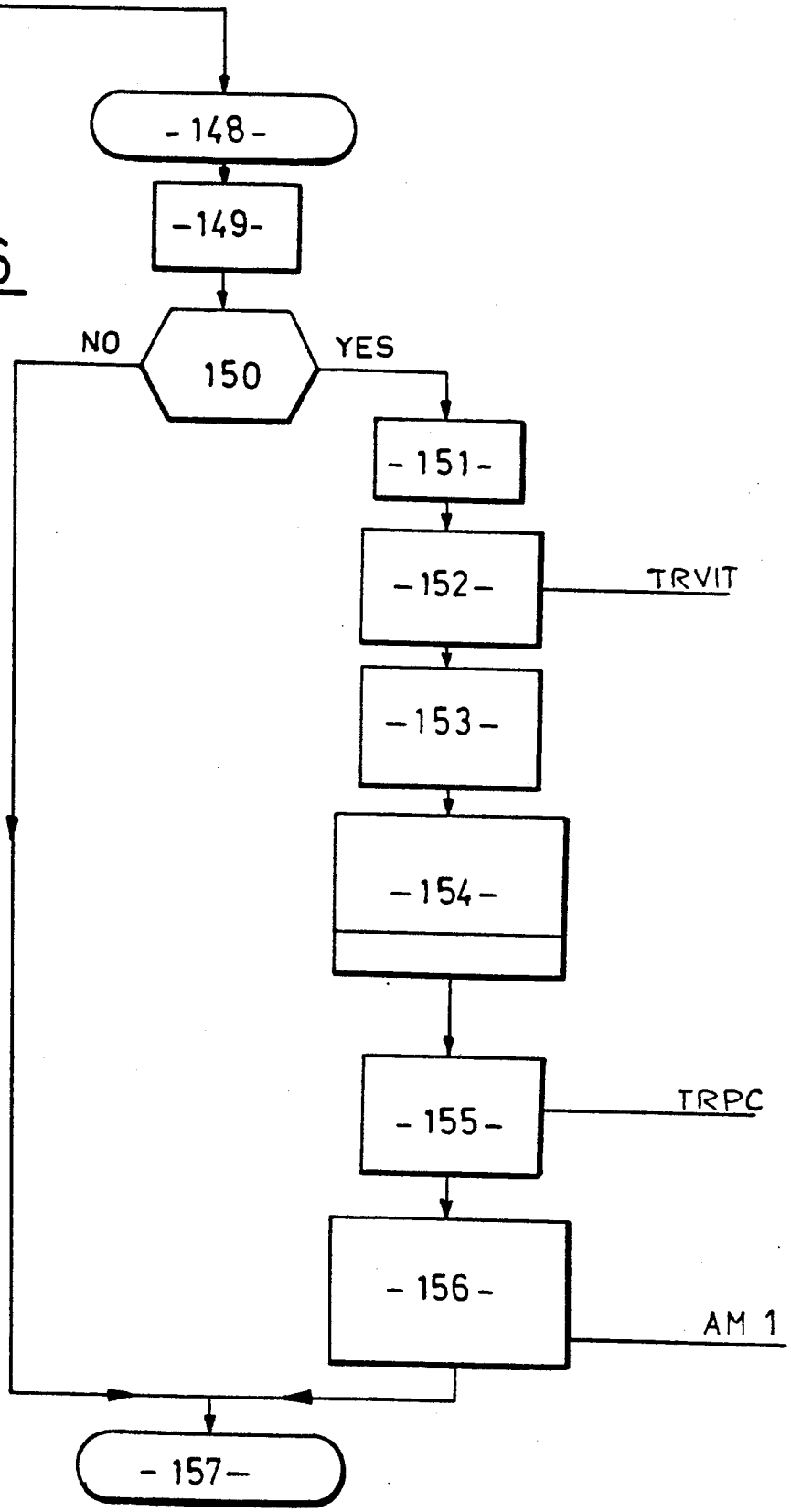
FIG. 16 is a flowchart for the processing, by the on-board device of the system, of messages coming from the central station.

The processing of the VHF messages coming from the central station 2 will be described with reference to the flowchart shown in FIG. 16.

The reception of a message RCPC coming from the central station by the interface circuit 12 of the circuit in FIG. 3 causes an interrupt phase 148 followed by a phase 149 of reading the received message.

During a phase 150, the number of the train in question is searched for in the received message.

If the number of the train is contained in the message, we move on to a phase 151 of reading the "target speed" and then to a phase 152 of transmission of the "target speed" to the interface 30 (FIG. 3) in the form of the signal TRVIT for the display of this information on the unit 15 (FIG. 2) for use by the driver.

Then, in a phase 153, there is a resetting to zero of a software counter C3 of non-received messages coming from the central station, and during a phase 154 there is activation of the temporal system and initiation of the watch dog 51 (FIG. 4).

During a phase 155, there is transmission of the message MESVHF to the interface 12 (FIG. 3) and transmission of the latter in the form of the signal TRPC to the central station 2.

During a phase 156 the "authorization to proceed AMI = 1" signal applied to the service braking circuit 16 (FIG. 3) is maintained, and then the system moves on to an end of interrupt phase 157.

If the message of the train in question is not in the message received from the central station, this signifies the central station no longer authorizes the train to proceed and the system goes directly from the phase 150 to the end of interrupt phase 157.

Figure 17:
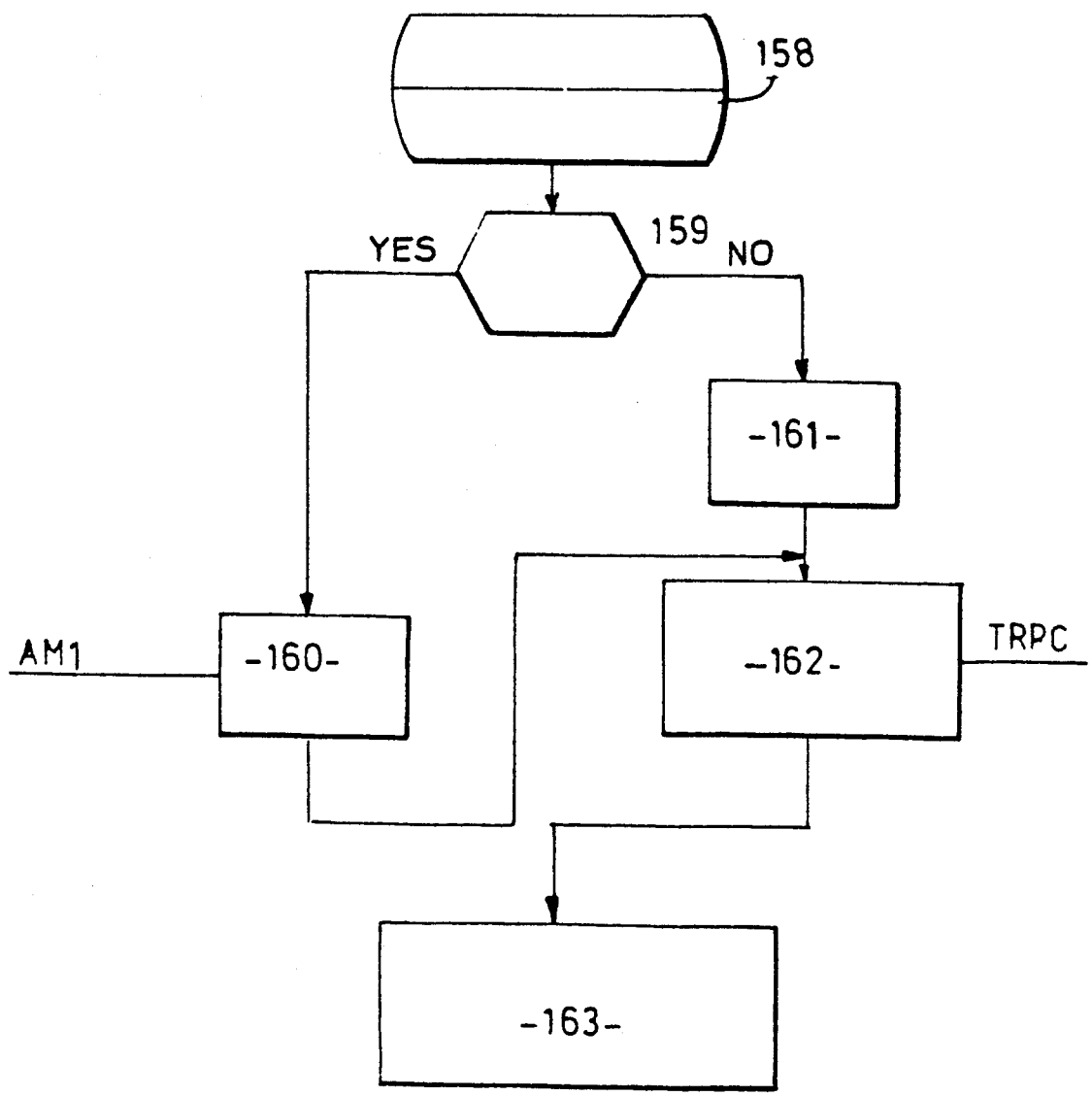
FIG. 17 is a flowchart illustrating the processing of the watch dog.

The flowchart of FIG. 17 shows the processing of the watch dog.

The expiration of the watch dog causes an interrupt phase 158 signifying that the time system is exhausted.

When the time system is exhausted, it is determined during a phase 159 whether or not the content of the software counter C3 of non-received messages is equal to 2.

If the answer is yes, there is, during a phase 160, a forcing of the signal AM1 to zero, and consequently the transmission of a braking instruction to the service braking circuit 16 (FIG. 3).

If the answer is no, there is an incrementation of the counter C3 during a phase 161 and, during a phase 162 also successive to the phase 160, there is transmission of the message MESVHF to the serial transmission interface 12 (FIG. 3) in the form of a signal TRPC to the central station 2.

The phase 162 is followed by a phase 163 of reloading the watch dog for the transmission of the next VHF message MESVHF and the forcing of the signal AM1 to "0" if two successive messages coming from the central station do not contain a train identification number.

This message is transmitted after the reception of a message from the central station (see FIG. 16) or at the expiration of the timing if the train receives no more messages from the central station 2.

Figure 18:
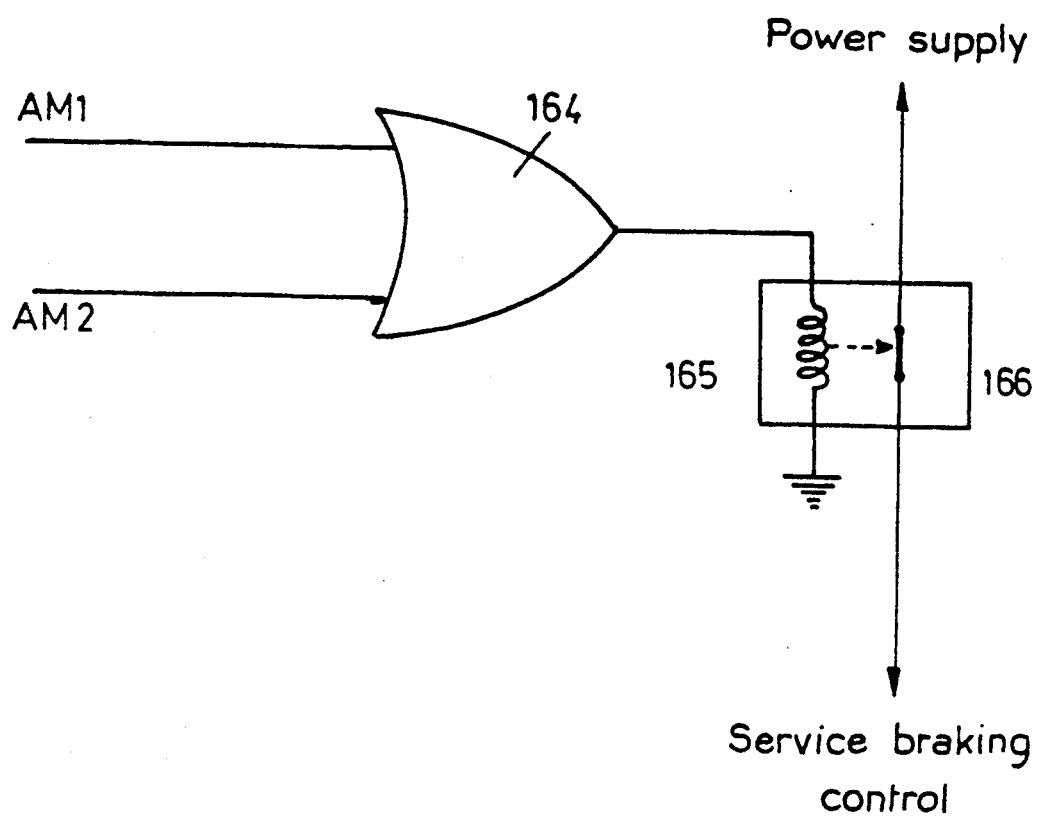
FIG. 18 shows in a more detailed way the service braking circuit associated with the circuit of FIG. 3.

In FIG. 18 an embodiment of the service braking circuit 16 of FIG. 3 is shown.

It comprises an OR gate 164 whose inputs receive the signals AM1 and AM2 from the interface adapter 24 (FIG. 3) and whose logic resultant supplies a signal controlling the coil 165 of a relay 166 connected in the power supply circuit of service braking control means (not shown).

I claim:

1. A system for the control of the progress of a plurality of railway trains in a railway network, comprising:
   a plurality of on-board devices for disposition on respective trains for detecting the position of the train with respect to the track;
   a plurality of means for transmitting and receiving communication messages for disposition on respective trains; and
   a central station, said central station comprising:
   a first storage means for the instantaneous storage of the relative positions of all of the trains in the railway network,
   a second storage means for storing the itineraries of each of the trains and the parameters of the railway network related to the speed range and the performance of the rolling stock in service, and
   means for receiving positional information from the plurality of trains detected by said on-board devices and transmitted by said means for transmitting and receiving, and transmitting at regular time intervals messages containing identification numbers of the trains in circulation in the railway network which are authorized to progress according to their itinerary after taking into account the positional information and the speed range parameters in said second storage means;
   wherein the messages transmitted from said central station are received by said means for transmitting and receiving on the respective trains, and wherein said plurality of on-board devices each comprises means for recognizing the identification number of its respective train and means for controlling the stopping of its respective train which in the absence of the train's respective identification number in the message received from said central station stops the train.

2. The system of claim 1, wherein:
   said central station comprises a central computer;
   said first storage means for the instantaneous storage of the relative positions of all of the trains in the railway network comprises a random access memory of said central computer;
   said means for receiving and transmitting of said central station comprises a transmitter-receiver having an antenna;
   said central computer has a data-phonic interface circuit connecting said central computer to said transmitter-receiver for communication with said plurality of on-board devices; and
   said second storage means for storing the itineraries of each of the trains and the parameters of the railway network related to the speed range and the performance of the rolling stock in service comprises a hard disk memory connected to said central computer.

3. The system of claim 2, wherein:
   said central station further comprises a control interface computer connected to said central computer, a plurality of power control circuits connected to said control interface computer and a display panel connected to said plurality of power control circuits having numerical displays and light indicators laying out a geographical reproduction of the railway network.

4. The system of claim 3, wherein:
   each said on-board device comprises an on-board computer, a Doppler radar for determining the position of the respective train with respect to the track on which it is travelling connected to said on-board computer, an interface circuit for modulated digital data insertion in a phonic channel connecting said on-board computer to its respective said means for transmitting and receiving, and telephonic equipment for the driver of the train also connected to said on-board computer by said interface circuit.

5. The system of claim 4, wherein:
said Doppler radar is connected to said on-board computer by an interface circuit for processing radar signals and a parallel interface circuit; and
said means for controlling the stopping of a respective train comprises a service braking control circuit also connected to said parallel interface circuit.

6. The system of claim 5, wherein:
each said on-board device further comprises a display unit for use by the driver of the respective train, a serial transmission circuit connected to said display unit, and a bus connecting said serial transmission circuit to said on-board computer.

7. The system of claim 6, wherein said interface circuit for processing radar signals comprises:
a microprocessor;
a first input connected to said microprocessor by a low pass filter, a variable gain amplifier and an analog-digital converter;
a second input, phase shifted by 90° with respect to said first input, connected to said microprocessor by a second low pass filter, a second variable gain amplifier and a second analog-digital converter;
a common data bus comprising a first interface bus between said first input and said microprocessor joined together with a second interface bus between said second input and said microprocessor;
a logic interrupt circuit for controlling said microprocessor, said logic interrupt circuit having a programmable clock associated therewith, and said programmable clock being connected to said common data bus;
a first interface circuit connected to an output of said microprocessor for generating a digitized Doppler signal; and
a second interface connected to an output of said microprocessor for generating a signal indicating the direction of the train.

8. The system of claim 7, wherein:
said interface circuit for processing radar signals further comprises a channel means connected to said second input of said interface circuit for supplying a signal SDI;
a plurality of passive beacon elements are disposed on the track; and
said signal SDI is a radar signal reflected by said plurality of passive beacon elements transformed into a rectangular signal corresponding to each passive beacon element encountered.

9. The system of claim 8, wherein said plurality of passive beacon elements are dihedrons, capable of reflecting radar signals, disposed on the track.

10. The system of claim 9, wherein said plurality of passive beacons comprises groups of said dihedrons disposed along the track at predetermined intervals known by said central station.

11. The system of claim 9, wherein said plurality of passive beacons elements comprises uncertainty removal beacons and repositioning beacons disposed at each branch point of the tracks in the railway network, said repositioning beacons only disposed along each track of the railway network at regular intervals, and space system loading beacons.

12. The system of claim 7, wherein:
a plurality of passive beacon elements are disposed on the track for reflecting signals from said Doppler radar, said plurality of passive beacon elements comprising dihedrons in groups at predetermined intervals along the track; and
each said on-board computer has a central processing unit with a program for processing the signals received from said plurality of passive beacons for the purpose of transmitting an identification number of said beacons to said central station for a precise geographic repositioning of the train, a program for the acquisition and recognition of beacon identification signals reflected by said dihedrons on the track, a program for processing signals from said Doppler radar supported by said microprocessor for constituting a Doppler signal which can be used by said central processing unit and in order to know the direction of travel of the train, a program for processing the signal from said Doppler radar for measuring the distance travelled by the train since the previous beacon encountered and transmitted to the central station and for the computation of the real speed transmitted to said display unit and a program for processing messages coming from said central station enabling transmission of a target speed to said display unit and authorization of the maintenance of the running of the train.

13. The system of claim 12, wherein said central processing unit of said on-board computer further has a program running in cycles for each said regular time interval for activating said service braking control circuit when two consecutive messages from said central station do not contain the identification number of the respective train or when two successive cycles are absent a message from said central station.

14. The system of claim 4, wherein:
said central station receives from said on-board devices of the trains only one item of location information sufficient for said central station to determine from its own time base the speed of each train; and
said central station detects faults in the measurement by said Doppler radar detecting the positions of the trains of the distance travelled by the trains by continuously checking the consistency of messages received with respect to previous messages received and with respect to data stored in said second storage means storing the itineraries of the trains and the parameters of the railway network related to the speed range.

15. The system of claim 1, wherein:
each said on-board device comprises an on-board computer, a Doppler radar for determining the position of the respective train with respect to the track on which it is travelling connected to said on-board computer, an interface circuit for modulated digital data insertion in a phonic channel connecting said on-board computer to its respective said means for transmitting and receiving, and telephonic equipment for the driver of the train also connected to said on-board computer by said interface circuit.

16. The system of claim 15, wherein:
said Doppler radar is connected to said on-board computer by an interface circuit for processing radar signals and a parallel interface circuit; and
said means for controlling the stopping of a respective train comprises a service braking control circuit also connected to said parallel interface circuit.

17. The system of claim 16, wherein:

each said on-board device further comprises a display unit for use by the driver of the respective train, a serial transmission circuit connected to said display unit, and a bus connecting said serial transmission circuit to said on-board computer.

18. The system of claim 17, wherein said interface circuit for processing radar signals comprises:
a microprocessor;
a first input connected to said microprocessor by a low pass filter, a variable gain amplifier and an analog-digital converter;
a second input, phase shifted by 90° with respect to said first input, connected to said microprocessor by a second low pass filter, a second variable gain amplifier and a second analog-digital converter;
a common data bus comprising a first interface bus between said first input and said microprocessor joined together with a second interface bus between said second input and said microprocessor;
a logic interrupt circuit for controlling said microprocessor, said logic interrupt circuit having a programmable clock associated therewith, and said programmable clock being connected to said common data bus;
a first interface circuit connected to an output of said microprocessor for generating a digitized Doppler signal; and
a second interface connected to an output of said microprocessor for generating a signal indicating the direction of the train.

19. The system of claim 18, wherein:
said interface circuit for processing radar signals further comprises a channel means connected to said second input of said interface circuit for supplying a signal SDI;
a plurality of passive beacon elements are disposed on the track; and
said signal SDI is a radar signal reflected by said plurality of passive beacon elements transformed into a rectangular signal corresponding to each passive beacon element encountered.

20. The system of claim 19, wherein said plurality of passive beacon elements are dihedrons, capable of reflecting radar signals, disposed on the track.

21. The system of claim 20, wherein said plurality of passive beacons comprises groups of said dihedrons disposed along the track at predetermined intervals known by said central station.

22. The system of claim 20, wherein said plurality of passive beacons elements comprises uncertainty removal beacons and repositioning beacons disposed at each branch point of the tracks in the railway network, said repositioning beacons only disposed along each track of the railway network at regular intervals, and space system loading beacons.

23. The system of claim 18, wherein:
a plurality of passive beacon elements are disposed on the track for reflecting signals from said Doppler radar, said plurality of passive beacon elements comprising dihedrons in groups at predetermined intervals along the track; and
each said on-board computer has a central processing unit with a program for processing the signals received from said plurality of passive beacons for the purpose of transmitting an identification number of said beacons to said central station for a precise geographic repositioning of the train, a program for the acquisition and recognition of beacon identification signals reflected by said dihedrons on the track, a program for processing signals from said Doppler radar supported by said microprocessor for constituting a Doppler signal which can be used by said central processing unit and in order to know the direction of travel of the train, a program for processing the signal from said Doppler radar for measuring the distance travelled by the train since the previous beacon encountered and transmitted to the central station and for the computation of the real speed transmitted to said display unit and a program for processing messages coming from said central station enabling transmission of a target speed to said display unit and authorization of the maintenance of the running of the train.

24. The system of claim 23, wherein said central processing unit of said on-board computer further has a program running in cycles for each said regular time interval for activating said service braking control circuit when two consecutive messages from said central station do not contain the identification number of the respective train or when two successive cycles are absent a message from said central station.

25. The system of claim 15, wherein:
said central station receives from said on-board devices of the trains only one item of location information sufficient for said central station to determine from its own time base the speed of each train; and
said central station detects faults in the measurement by said Doppler radar detecting the positions of the trains of the distance travelled by the trains by continuously checking the consistency of messages received with respect to previous messages received and with respect to data stored in said second storage means storing the itineraries of the trains and the parameters of the railway network related to the speed range.

26. The system of claim 2, wherein:
each said on-board device comprises an on-board computer, a Doppler radar for determining the position of the respective train with respect to the track on which it is travelling connected to said on-board computer, an interface circuit for modulated digital data insertion in a phonic channel connecting said on-board computer to its respective said means for transmitting and receiving, and telephonic equipment for the driver of the train also connected to said on-board computer by said interface circuit.

27. The system of claim 26, wherein:
said Doppler radar is connected to said on-board computer by an interface circuit for processing radar signals and a parallel interface circuit; and
said means for controlling the stopping of a respective train comprises a service braking control circuit also connected to said parallel interface circuit.

28. The system of claim 27, wherein:
each said on-board device further comprises a display unit for use by the driver of the respective train, a serial transmission circuit connected to said display unit, and a bus connecting said serial transmission circuit to said on-board computer.

29. The system of claim 28, wherein said interface circuit for processing radar signals comprises:
a microprocessor;

a first input connected to said microprocessor by a low pass filter, a variable gain amplifier and an analog-digital converter;

a second input, phase shifted by 90° with respect to said first input, connected to said microprocessor by a second low pass filter, a second variable gain amplifier and a second analog-digital converter;

a common data bus comprising a first interface bus between said first input and said microprocessor joined together with a second interface bus between said second input and said microprocessor;

a logic interrupt circuit for controlling said microprocessor, said logic interrupt circuit having a programmable clock associated therewith, and said programmable clock being connected to said common data bus;

a first interface circuit connected to an output of said microprocessor for generating a digitized Doppler signal; and a second interface connected to an output of said microprocessor for generating a signal indicating the direction of the train.

30. The system of claim 29, wherein:

said interface circuit for processing radar signals further comprises a channel means connected to said second input of said interface circuit for supplying a signal SDI;

a plurality of passive beacon elements are disposed on the track; and said signal SDI is a radar signal reflected by said plurality of passive beacon elements transformed into a rectangular signal corresponding to each passive beacon element encountered.

31. The system of claim 30, wherein said plurality of passive beacon elements are dihedrons, capable of reflecting radar signals, disposed on the track.

32. The system of claim 31, wherein said plurality of passive beacons comprises groups of said dihedrons disposed along the track at predetermined intervals known by said central station.

33. The system of claim 31, wherein said plurality of passive beacons elements comprises uncertainty removal beacons and repositioning beacons disposed at each branch point of the tracks in the railway network, said repositioning beacons only disposed along each track of the railway network at regular intervals, and space system loading beacons.

34. The system of claim 29, wherein:

a plurality of passive beacon elements are disposed on the track for reflecting signals from said Doppler radar, said plurality of passive beacon elements comprising dihedrons in groups at predetermined intervals along the track; and each said on-board computer has a central processing unit with a program for processing the signals received from said plurality of passive beacons for the purpose of transmitting an identification number of said beacons to said central station for a precise geographic repositioning of the train, a program for the acquisition and recognition of beacon identification signals reflected by said dihedrons on the track, a program for processing signals from said Doppler radar supported by said microprocessor for constituting a Doppler signal which can be used by said central processing unit and in order to know the direction of travel of the train, a program for processing the signal from said Doppler radar for measuring the distance travelled by the train since the previous beacon encountered and transmitted to the central station and for the computation of the real speed transmitted to said display unit and a program for processing messages coming from said central station enabling transmission of a target speed to said display unit and authorization of the maintenance of the running of the train.

35. The system of claim 34, wherein said central processing unit of said on-board computer further has a program running in cycles for each said regular time interval for activating said service braking control circuit when two consecutive messages from said central station do not contain the identification number of the respective train or when two successive cycles are absent a message from said central station.

36. The system of claim 26, wherein:

said central station receives from said on-board devices of the trains only one item of location information sufficient for said central station to determine from its own time base the speed of each train; and said central station detects faults in the measurement by said Doppler radar detecting the positions of the trains of the distance travelled by the trains by continuously checking the consistency of messages received with respect to previous messages received and with respect to data stored in said second storage means storing the itineraries of the trains and the parameters of the railway network related to the speed range.

* * * * *